United States Patent
Qadeer et al.

(10) Patent No.: US 7,555,418 B1
(45) Date of Patent: Jun. 30, 2009

(54) PROCEDURE SUMMARIES FOR MULTITHREADED SOFTWARE

(75) Inventors: Shaz Qadeer, Seattle, WA (US); Niels Jakob Rehof, Redmond, WA (US); Sriram K. Rajamani, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 10/742,695

(22) Filed: Dec. 19, 2003

(51) Int. Cl.
*G06F 9/45* (2006.01)
(52) U.S. Cl. ............................... 703/22
(58) Field of Classification Search .............. 703/22
See application file for complete search history.

(56) References Cited

U.S. PATENT DOCUMENTS

| | | | |
|---|---|---|---|
| 6,546,443 | B1 | 4/2003 | Kakivaya et al. |
| 2002/0166032 | A1 | 11/2002 | Qadeer |
| 2002/0178401 | A1 | 11/2002 | Ball et al. |
| 2003/0204570 | A1 | 10/2003 | Rehof et al. |
| 2003/0204641 | A1 | 10/2003 | Rehof et al. |
| 2003/0204834 | A1 | 10/2003 | Ball et al. |

OTHER PUBLICATIONS

Tyrrell et al. "CSP Methods for Identifying Atomic Actions in the Design of Fault Tolerant Concurrent Systems" IEEE 1995.*
Reps et al. "Precise Interprocedural Dataflow Analysis via Graph Reachability", 1995 ACM.*
Alur et al., "Modular Refinement of Hierarchic Machines," *In Proceedings of the 27th Annual ACM Symposium on Principles of Programming Languages*, pp. 390-402, 2000.
Ball et al., "Parameterized Verification of Multithreaded Software Libraries," *In TACAS 01: Tools and Algorithms for Construction and Analysis of Systems*, Lecture Notes in Computer Science, vol. 2031, pp. 158-173, Springer-Verlag, 2001.
Ball et al., "Bebop: A Symbolic Model Checker for Boolean Programs," *In SPIN 00: SPIN Workshop, SPIN Model Checking and Software Verification*, Lecture Notes in Computer Science, vol. 1885, pp. 113-130, Springer-Verlag, 2000.
Bouajjani et al., "A Generic Approach to the Static Analysis of Concurrent Programs with Procedures," *Annual Symposium on Principles of Programming Languages Proceedings of the 30th ACM SIGPLAN-SIGACT Symposium on Principles of Programming Languages*, pp. 62-73, ACM Press, Jan. 2003.
Das et al., "ESP: Path-Sensitive Program Verification in Polynomial Time," *In Proceedings of the ACM SIGPLAN*, 12 pages; 2002.

(Continued)

*Primary Examiner*—Kamini S Shah
*Assistant Examiner*—Saif A Alhija
(74) *Attorney, Agent, or Firm*—Klarquist Sparkman, LLP

(57) ABSTRACT

Procedure summaries can be generated and used for multi-threaded software. A set of actions for a software procedure can be identified as atomically modelable with respect to multithreaded execution of the software. Such actions can be considered a transaction and deemed to have occurred one after another without interruption by other threads. Thus, multithreaded execution of the software can be modeled to detect programming flaws. For example, reachability analysis can be used in concert with the procedure summaries to determine if specified invariants fail.

19 Claims, 19 Drawing Sheets

OTHER PUBLICATIONS

Delzanno et al., "Towards the Automated Verification of Multithreaded Java Programs," *International Conference on Tools and Algorithms for Construction and Analysis of Systems*, Grenoble, France, 16 pages, 2002.

Duesterwald et al., "Concurrency Analysis in the Presence of Procedures Using Data-Flow Framework," *International Symposium on Software Testing and Analysis, Proceedings of the Symposium Testing, Analysis, and Verification*, pp. 36-48, 1991.

Dwyer et al., "Data Flow Analysis for Verifying Properties of Concurrent Programs," *In Proceedings of the ACM SIGSOFT Symposium on foundations of Software Engineering*, pp. 62-75, Dec. 1994.

Esparza et al., "Efficient Algorithms for pre* and post* on Interprocedural Parallel Flow Graphs," *Annual Symposium on Principles of Programming Languages, Proceedings of the 27th ACM SIGPLAN-SIGACT Symposium on Principles of Programming Languages*, pp. 1-11, 2000.

Esparza, "A BDD-based Model Checker for Recursive Programs," *In CAV'01, Proceedings of the 13th International Conference on Computer Aided Verification*, pp. 324-336, 2001.

Flanagan et al., "Thread-Modular Model Checking," *Model Checking Software: 10th International SPIN Worskop*, Lecture Notes in Computer Science, vol. 2648; pp. 213-225, Springer-Verlag, May 2003.

Flanagan et al., "Transactions for Software Model Checking," *Electronic Notes in Theoretical Computer Science*, vol. 89, No. 3, 22 pages, Sep. 2003.

Flanagan et al., "A Type and Effect System for Atomicity," *Conference on Programming Language Design and Implementation, Proceedings of the ACM SIGPLAN 2003 Conference on Programming Language Design and Implementation*, pp. 338-349, ACM, Jun. 2003.

Flanagan et al., "Types for Atomicity," *Types In Languages Design And Implementation, Proceedings of the 2003 ACM SIGPLAN International Workshop on Types in Languages Design and Implementation*, pp. 1-12, ACM, Jan. 2003.

Henzinger et al., "Decomposing, Refinement Proofs Using Assume-Guarantee Reasoning," *Proceedings of the IEEE/ACM International Conference on Computer-aided Design (ICCAD 2000)*, pp. 245-252, 2000.

Lipton, "Reduction: A Method of Proving Properties of Parallel Programs," *Communications of the ACM*, vol. 18, No. 12, pp. 717-721, Dec. 1975.

Ramalingam, "Research Report: Context-Sensitive Synchronization-Sensitive Analysis Undecidable," *ACM Transactions on Programming Languages and Systems*, vol. 22, No. 2, pp. 416-430, Mar. 2000.

Reps et al., "Precise Interprocedural Dataflow Analysis via Graph Reachability," *In Conference Record of the 22nd Annual Symposium on Principles of Programming Languages (POPL'95)*, pp. 49-61, ACM, 1995.

Rinard, "Analysis of Multithreaded Programs," *In SAS 01: Static Analysis*, Lecture Notes in Computer Science, vol. 2126, pp. 1-19, Springer-Verlag, 2001.

U.S. Appl. No. 60/450,982, filed Feb. 28, 2003, Rehof et al.

U.S. Appl. No. 10/659,221, filed Dec. 10, 2003, Rehof et al.

Flanagan et al., "Thread-Modular Verification for Shared-Memory Programs," HP Labs Technical Reports, SRC Technical Note 2001-003, Compaq Computer Corporation, 20 pages, Nov. 19, 2001.

Flanagan et al., "Thread-Modular Verification for Shared-Memory Programs," Lecture Notes in Computer Science, Proceedings of the 11th European Symposium on Programming Languages and Systems, Springer-Verlag, London, UK, 15 pages, Apr. 2002.

Freund et al., "Checking Concise Specifications for Multithreaded Software," Williams College Technical Note 01-2002, 16 pages, Dec. 2002.

Freund et al., "Checking Concise Specifications for Multithreaded Software," FTfJP'2003, Proceedings of the Fifth ECOOP Workshop on Formal Techniques for Java-like Programs, Darmstadt, Germany, 10 pages, Jul. 21, 2003.

Freund et al., "Checking Concise Specifications for Multithreaded Software," Williams College Technical Note 01-2002 (revised Dec. 2003), 18 pages, Dec. 12, 2003.

Larsen, et al., "Bisimulation Through Probabilistic Testing (Preliminary Report)," Proceedings of the 16th ACM SIGPLAN-AIGACT Symposium on Principles of Programming Languages, pp. 344-352, 1989.

Per Cederqvist et al., "Version Management with CVS (for CVS 1.11.10)," 184 pages, Dec. 4, 2003.

Sharir et al., "Two Approaches to Interprocedural Data Flow Analysis," *Program Flow Analysis: Theory and Applications*, Prentice-Hall, Inc., pp. 189-233, 1981.

Steffen and Burkart, "Composition, Decomposition and Model Checking of Pushdown Processes," *Nordic Journal of Computing*, vol. 2, pp. 89-125, 1995.

Whaley et al., "Compositional Pointer and Escape Analysis for Java Programs," Proceedings of the 14th ACM SIGPLAN, Conference on Object-Oriented Programming, Systems, Languages, and Applications, Denver, Colorado, ACM Press, New York, NY, pp. 187-206, 1999.

Flanagan et al., "Thread-Modular Verification for Shared-Memory Programs," HP Labs Technical Reports, SRC Technical Note 2001-003, Compaq Computer Corportion, 20 pages, Nov. 19, 2001.

Flanagan et al., "Thread-Modular Verification for Shared-Memory Programs," Lecture Notes in Computer Science, Proceedings of the 11th European Symposium on Programming Languages and Systems, Springer-Verlag, London, UK, 15 pages, Apr. 2002.

Freund et al., "Checking Concise Specifications for Multithreaded Software," Williams College Technical Note Jan. 2002, 16 pages, Dec. 2002.

Freund et al., "Checking Concise Specifications for Multithreaded Software," FTfJP'2003, Proceedings of the Fifth ECOOP Workshop on Formal Techniques for Java-like Programs, Darmstadt, Germany, 10 pages, Jul. 21, 2003.

Freund et al., "Checking Concise Specifications for Multithreaded Software," Williams College Technical Note Jan. 2002 (revised Dec. 2003), 18 pages, Dec. 12, 2003.

Hoare, *Communicating Sequential Processes*, Prentice-Hall International Series in Computer Science, Prentice Hall, pp. i-256, 1985.

Lamport, " A New Appraoch to Proving the Correctness of Multiprocess Programs," ACM Transactions on Programming Languages and System, vol. 1, No. 1, pp. 84-97, Jul. 1979.

Larsen, et al., "Bisimulation Through Probabilistic Testing (Preliminary Report)," Proceedings of the 16th ACM SIGPLAN-AIGACT Symposium on Principles of Programming Languages, pp. 344-352, 1989.

Milner, *Communication and Concurrency*, Prentice-Hall International Series in Computer Science, Prentice Hall, pp. i-260, 1989.

Milner, *Communicating and Mobile Systems: the π-Calculus*, Cambridge University Press, pp. i-161, 1999.

Per Cederqvist et al., "Version Management with CVS (for CVS 1.11.10), " 184 pages, Dec. 4, 2003.

Roscoe, *The Theory and Practice of Concurrency*, Prentice Hall Series in Computer Science, Prentice Hall, pp. i-566, 1998.

Sharir et al., "Two Approaches to Interprocedural Data Flow Analysis," *Program Flow Analysis: Theory and Applications*, Prentice-Hall, Inc., pp. 189-233, 1981.

Steffen and Burkart, "Composition, Decomposition and Model Checking of Pushdown Processes," *Nordic Journal of Computing*, vol. 2, pp. 89-125, 1995.

Whaley et al., "Compositional Pointer and Escape Analysis for Java Programs," Proceedings of the 14th ACM SIGPLAN, Conference on Object-Oriented Programming, Systems, Languages, and Applications, Denver, Colorado, ACM Press, New York, NY, pp. 187-206, 1999.

* cited by examiner

PROCEDURE SUMMARIES FOR MULTITHREADED SOFTWARE

TECHNICAL FIELD

The technical field relates to analysis of multithreaded software, such as modeling and testing multithreaded software.

BACKGROUND

The sheer complexity of the software development process makes it increasingly difficult for programmers to detect programming flaws. As a result, software testing has become an important part of software development.

Software can be tested by a human tester who executes the software and monitors its progress. However, as the complexity of the software increases, it becomes virtually impossible for a person to reproduce all possible execution scenarios in a reasonable amount of time. Therefore, testers can build a model of the software to model (e.g., simulate) execution of the software. Because modeling allows automated exploration of the software, it can perform a more extensive analysis than what is possible by human analysts.

One technique for modeling software is procedure summarization. Procedure summaries can represent a summarization of calculations done in software. In this way, calculations during modeling can be simplified, and more efficient modeling of execution can be performed.

For example, if during execution, the software has state s when it enters a procedure P and state s' when it exits the procedure, a summary of the procedure can include the following state pair:

(s,s')

In practice, the summary of a procedure contains such a state pair if in state s there is an invocation of P that yields the state s' on termination. Thus, the summary can include plural state pairs, one for each possible pair of initial state and resulting states. The procedure summary can be used in place of executing the procedure during modeling.

Procedure summaries have been used with success for sequential programs. However, for multithreaded software, some of the state variables may be shared by multiple threads. Thus, conventional procedure summaries are of little use. For example, during execution of the procedure, updates to shared state variables may be performed by interleaved actions of concurrently executing threads. Such actions may depend on the local states of the other threads. Therefore, the state pairs do not accurately reflect the possible resulting states in a multithreaded execution scenario.

So, there still exists a need for improving procedure summary technology.

SUMMARY

Procedure summaries can be generated for multithreaded software and used to model execution of multithreaded software. For example, a set of actions for a procedure can be identified as atomically modelable with respect to multithreaded execution of the actions. Atomic modelability can include the property that the actions can be modeled together without regard to possible interleaved actions from other threads. The actions can be deemed to have occurred one after the other without interruption by other threads. For such actions, a partial summary of the procedure can be constructed. A procedure summary can then include one or more such partial summaries. During modeling, the partial procedure summaries can be used to accurately model state during multithreaded execution (e.g., even if execution of the procedure by one thread is subject to interrupting by other threads sharing state variables.)

Such sets of actions can be described as a transaction. Actions in the transaction can be deemed to have occurred one after another without interruption by other threads. A multithreaded program can thus be modeled as a series of such transactions.

In addition, a variable local to each thread can track the phase of a transaction for the thread. By watching the variable, transaction boundaries can be determined.

Programming flaws can be detected via the procedure summaries. For example, a program can include specified invariants (e.g., assert statements), and the procedure summaries can be used to identify when an invariant fails.

The partial procedure summaries can indicate an initial and resulting location (e.g., a program counter) in the procedure. In this way, the partial procedure summaries can be pieced together.

The procedure summaries can allow reuse of analysis results across different call sites in a multithreaded program. For example, a reachability analysis can employ procedure summaries for multithreaded programs.

The mover status of procedure actions can be determined. Based on the mover status, a set of actions atomically modelable with respect to multithreaded execution of the software can be identified. For example, a transactional boundary can be found according to the mover status of the actions.

The procedure summaries can be used to model various multithreaded programs that use shared variables, synchronization, and recursion. For example, a single transaction can be used to model recursion.

The foregoing and other features and advantages will become more apparent from the following detailed description of disclosed embodiments, which proceeds with reference to the accompanying drawings.

DETAILED DESCRIPTION

Overview

In the following description of the disclosed technology, reference is made to the accompanying drawings which form a part hereof, and in which is shown by way of illustration specific embodiments in which the invention may be practiced. Other embodiments may be utilized and structural changes may be made without departing from the scope of the disclosed technology.

Example 1

Figure 1:
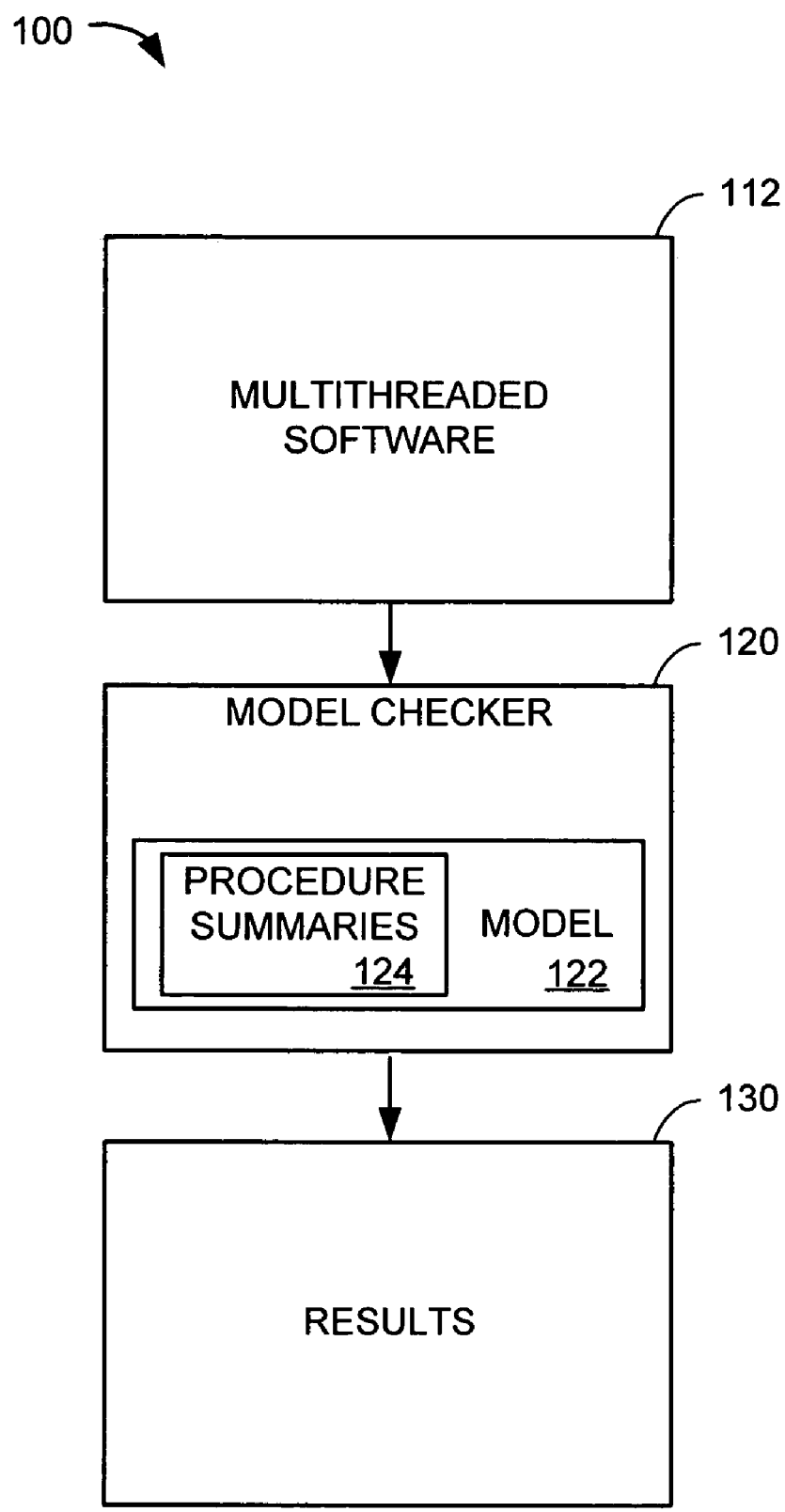
FIG. 1 is a block diagram showing an exemplary system for analyzing multithreaded software via procedure summaries.

Exemplary System for Analyzing Multithreaded Software via Procedure Summaries FIG. 1 is a block diagram representing an exemplary system 100 for analyzing multithreaded software via procedure summaries. In the example, the system takes multithreaded software 112 as input. A model checker 120 analyzes the multithreaded software 112. For example, the model checker 120 can model execution of multithreaded software 112 to detect programming flaws.

In practice, the multithreaded software 112 can be first converted into a model 122, which can represent the multithreaded software 112 in a form appropriate to facilitate modeling. In the example, the model 122 can include one or more procedure summaries 124.

The model checker 120 can generate results 130. For example, the model checker can indicate whether the multithreaded software 112 contains programming flaws and information about such flaws.

Example 2

Figure 2:
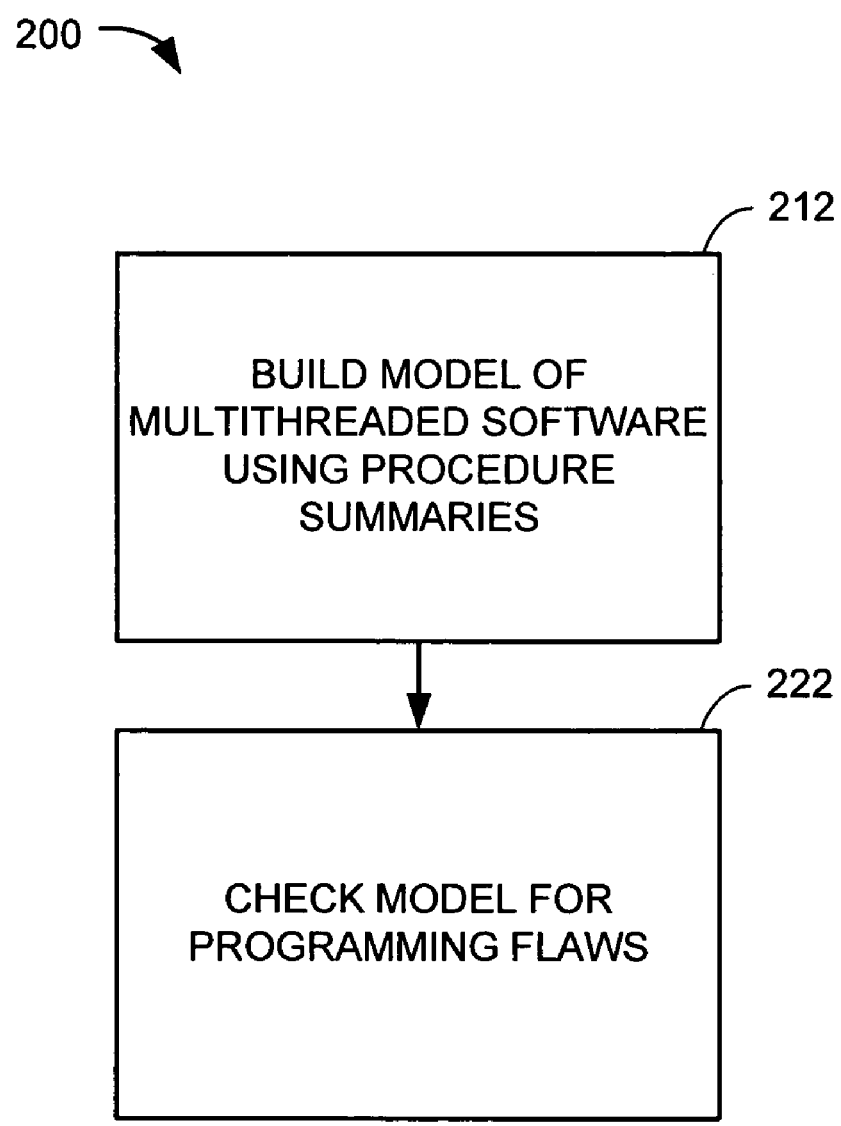
FIG. 2 is a flowchart showing an exemplary method for analyzing multithreaded software via procedure summaries, such as with the system shown in FIG. 1.

Exemplary Method for Analyzing Multithreaded Software with Procedure Summaries FIG. 2 is a flowchart showing an exemplary method 200 for analyzing multithreaded software via procedure summaries, such as with the system shown in FIG. 1. The methods of any of the examples described herein can be performed in software executing computer-executable instructions. Such instructions can be stored in one or more computer-readable media.

At 212, a model of the multithreaded software is built using procedure summaries. For example, as described herein, partial procedure summaries can be generated for actions within the procedures of the multithreaded software.

At 222, the model can be checked for programming flaws. For example, as described herein, execution of the software can be modeled to detect whether any specified invariants (e.g., asserts) fail for any execution path of the software.

In practice, building the model and checking for programming flaws can be combined into a single process. For example, the model can be built as the model for the software is checked for programming flaws.

Example 3

Exemplary Multithreaded Software

Exemplary multithreaded software includes software that makes use of more than one thread during execution of the software. For example, multithreaded software can include a scenario where two threads access one or more shared variables. Such software can include synchronization mechanisms (e.g., locks, mutexes, semaphores and the like) to avoid undesirable phenomena such as race conditions for shared variables or other conditions associated with execution of concurrent programs.

Example 4

Exemplary State

In any of the examples described herein, the state of software can include a wide variety of variables. Such variables can include global variables, local variables, or some combination thereof.

Although the state of a program can include the state of a stack, the procedure summaries described herein need not take stack state into account. For example, the state of a stack can be tracked when invoking a procedure, but a stack internal to the procedure (e.g., stack frames generated by the procedure) need not be represented during modeling.

Example 5

Exemplary Procedures

In any of the examples described herein, procedures can include any set of executable instructions, actions, or operations grouped into an invocable unit, such as a procedure or a function. In practice, procedures typically have zero or more parameters, which can be operate as input parameters, output parameters, or some combination thereof.

Example 6

Exemplary Programming Flaws

In any of the examples described herein, analysis of multithreaded software can include detecting programming flaws of the software. Exemplary programming flaws can include a wide variety of conditions, widely referred to as "bugs." To detect programming flaws, programmers have developed a variety of mechanisms.

For example, one such mechanism is a specified invariant. An example implementation of a specified invariant is called an "assert." The assert indicates a condition (i.e., and assertion) that is believed to be invariant at a particular location within the software. If the condition is false for any possible set of execution paths, a programming flaw is indicated. In such a case, the assert is said to have failed.

For example, a programmer can include the following assertion in the programming code:

assert (pAction != NULL)

If it is possible that the software can reach the location of the assertion, and pAction is NULL (i.e., the assertion is false and the invariant is not correct), the assert has failed. Thus, a programming flaw is indicated.

In practice, the assert can be implemented as a runtime check (e.g., during debugging), or the assert can be used during modeling of the software. For example, the assert mechanism can be used in any of the examples described herein. If it is determined that the assert fails during modeling using procedure summaries, a programming flaw is indicated.

Details about the flaw can be produced to aid in debugging the software. For example, a location of the assert within the software, the current state, and execution history can be indicated by the model checking software. The programmer can use the information to determine the cause of the assertion failure.

Example 7

Exemplary Model Checker

Figure 3:
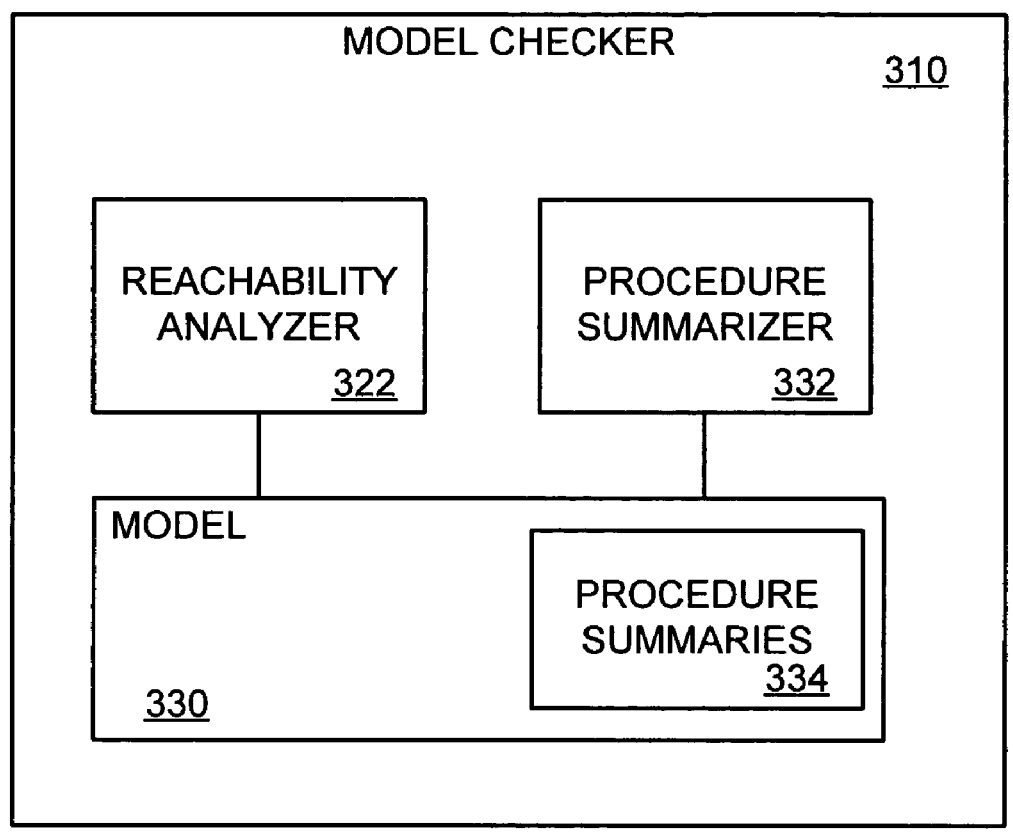
FIG. 3 is a block diagram showing an exemplary model checker using procedure summaries for analyzing multithreaded software.

FIG. 3 shows an exemplary model checker 310 using procedure summaries for analyzing multithreaded software. The model checker 310 can accept multithreaded software as input and then generate and analyze a model 330 representing the software.

In the example, the model checker 310 includes a reachability analyzer 322 and a procedure summarizer 332. The reachability analyzer 322 is operable to determine the possible execution paths for the multithreaded software, and the possible states of the software during such execution paths. The procedure summarizer 332 is operable to generate procedure summaries 334 for the multithreaded software as part of the model 330 of the software. The reachability analyzer 322 can consult the procedure summaries 334 during its analysis.

In the example, the reachability analyzer 322 can model one or more stacks for the software. The procedure summaries 334 need not model a stack. Thus, the model checker 310 can explore software states with stacks and procedure summaries without stacks. As a result, summarization can avoid direct representation of the call stack.

Example 8

Figure 4:
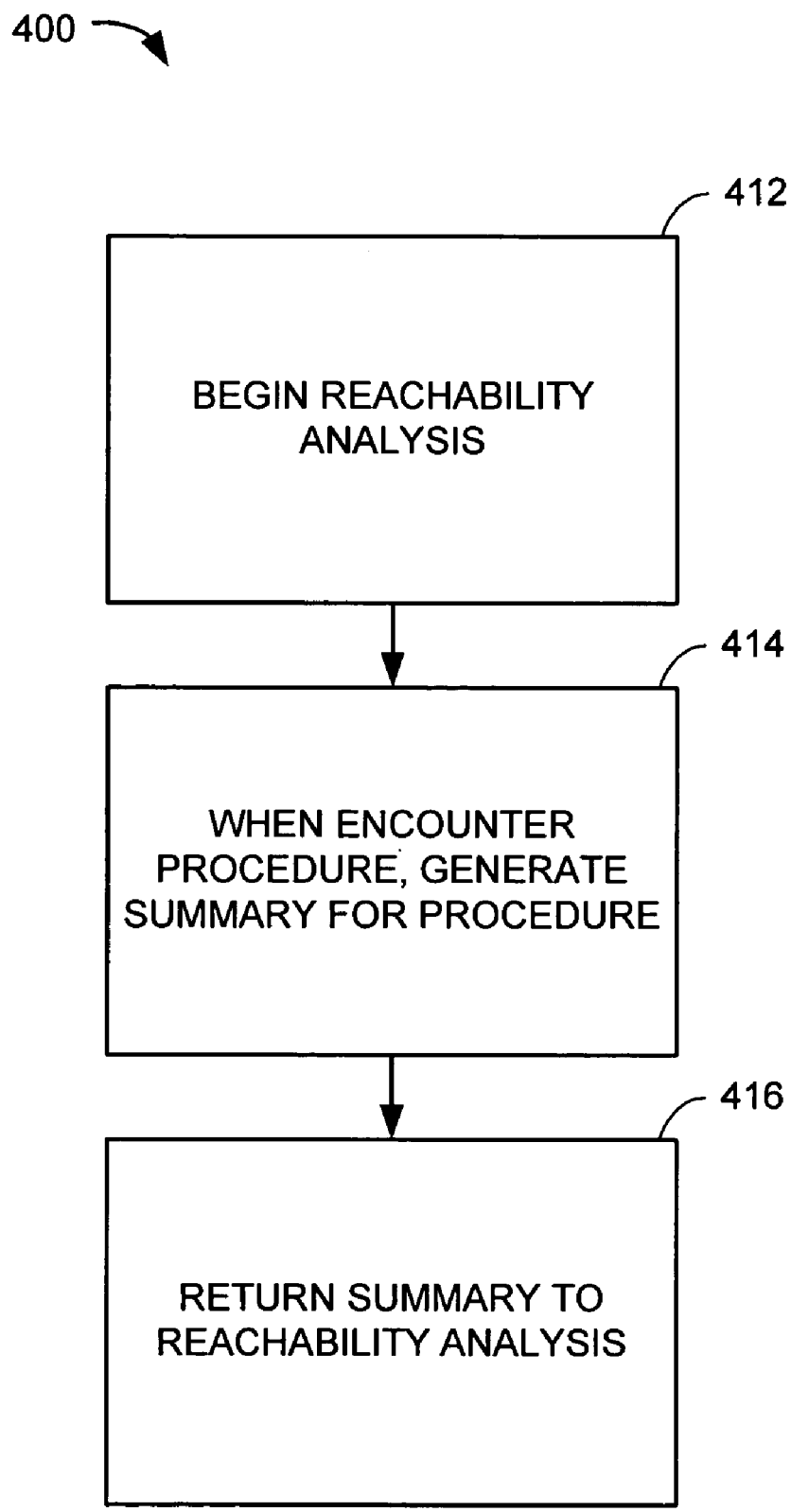
FIG. 4 is a flowchart showing an exemplary method using reachability and procedure summaries to analyze multithreaded software.

Exemplary Method for Analyzing Multithreaded Software via Reachability Analysis and Procedure Summaries FIG. 4 shows an exemplary method 400 using reachability and procedure summaries to analyze multithreaded software.

At 412, reachability analysis of the multithreaded software begins. For example, reachability analysis can include modeling execution of the software by determining the possible execution paths of software and systematically exploring the state of the software during such execution paths.

At 414, when a procedure is encountered, a summary for the procedure is generated. For example, partial procedure summaries can be calculated by software.

At 416, the summary is returned for consultation by the reachability analysis. The reachability analysis can then continue. For example, the reachability analysis can determine possible execution paths within the procedure and use the procedure summary to explore possible states. If the procedure is encountered again during reachability analysis, the procedure summary can be reused rather than re-generated.

Example 9

Exemplary Partial Procedure Summaries

In any of the examples, a procedure can be summarized by a plurality of partial procedure summaries. Partial procedure summaries can resemble procedure summaries and can have the same properties. However, partial procedure summaries can be used to accurately model multithreaded software.

Figure 5:
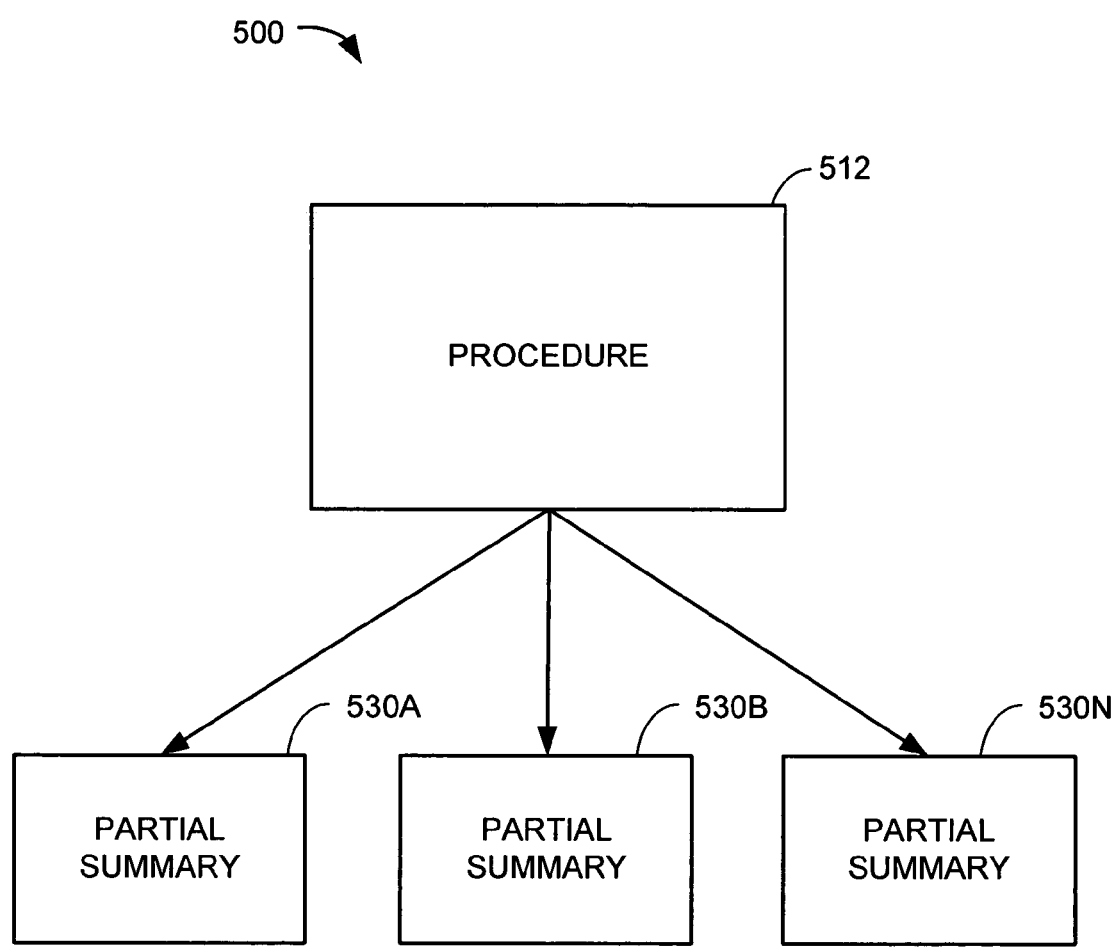
FIG. 5 is a block diagram showing exemplary partial summaries for a procedure.

FIG. 5 shows an exemplary arrangement 500 in which a plurality of partial summaries 530A-530N have been generated for a procedure 512. The partial procedure summaries 530A-530N can summarize less than all of the procedure 512 (e.g., summarize up to a location in the middle of the procedure 512, rather than summarizing from beginning to end).

In combination, the partial procedure summaries 530A-530N can model execution of the entire procedure and accurately model state of the software 512 during multithreaded execution, even if the procedure 512 is subject to interruption by other threads.

Example 10

Exemplary Method for Generating Partial Procedure Summaries

Figure 6:
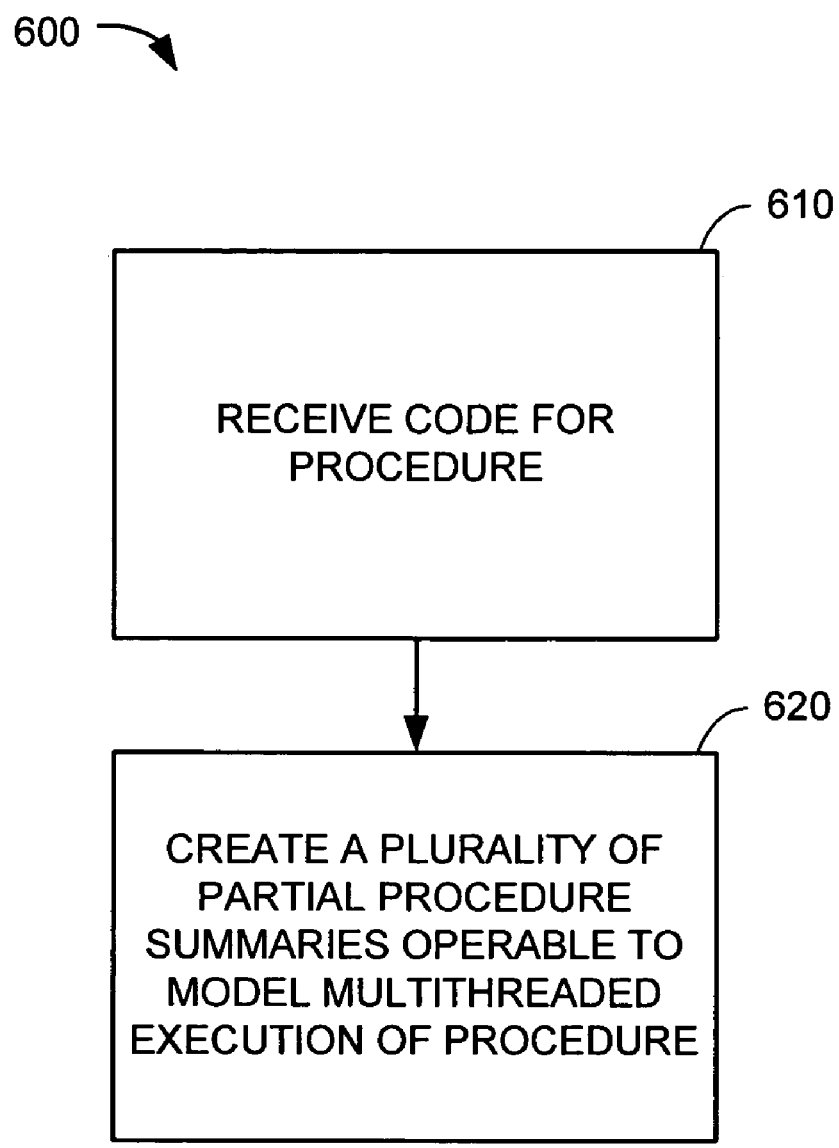
FIG. 6 is a flowchart showing an exemplary method for generating partial procedure summaries.

FIG. 6 shows an exemplary method 600 for generating partial procedure summaries, such as those shown in FIG. 5.

At 610, procedure code is received (e.g., by a procedure summarizer). The code can take the form of source code or object code.

At 620, a plurality of partial procedure summaries operable to model multithreaded execution of the procedure are generated. For example, the partial procedure summaries can accurately model the state of the software, even if the procedure is subject to interruption by other threads.

In practice, some procedures of multithreaded software can be summarized without resorting to partial procedure summaries.

Example 11

Exemplary Procedure Actions

Figure 7:
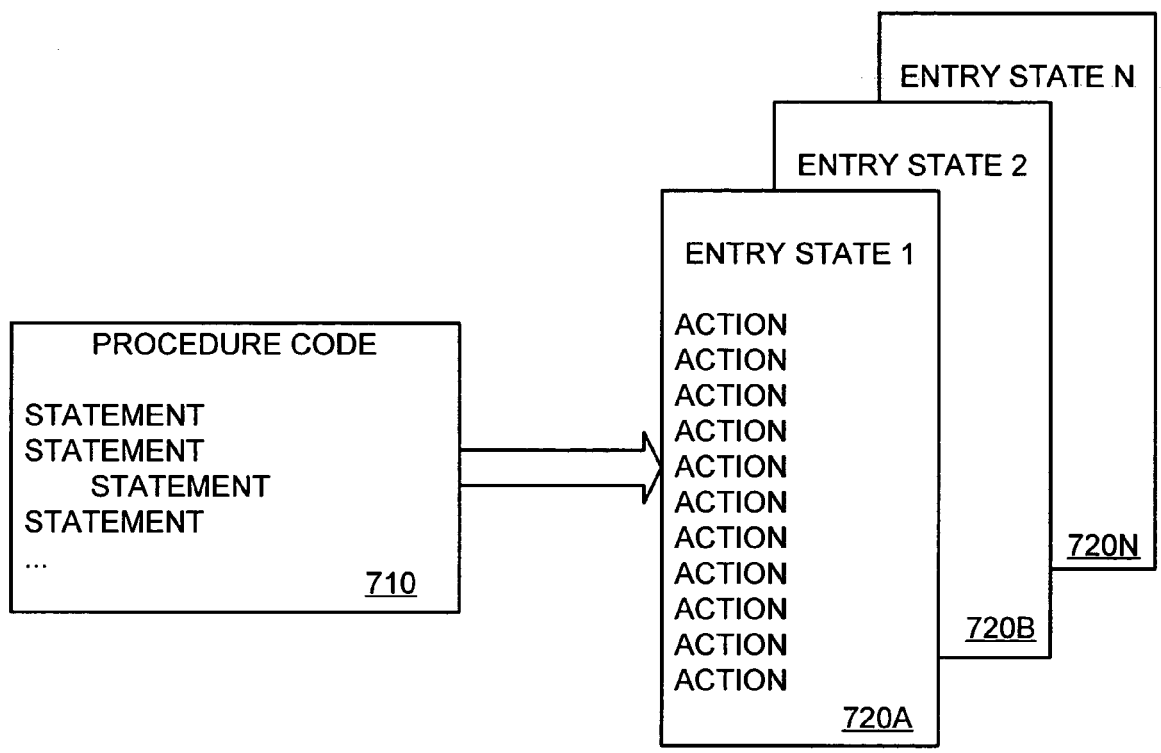
FIG. 7 is a block diagram showing exemplary actions for a procedure.

FIG. 7 illustrates exemplary actions for a procedure having procedure code 710. In the example, the procedure code 710 comprises a plurality of statements. When the statements are executed, the execution can result in any of the one or more series of actions 720A-720N by the procedure, after which the procedure can terminate. The actions can affect the initial state of the software, leaving the software in a resulting state.

As shown in the example, the actions may differ depending on the entry state for the procedure code 710. For example, execution may take different paths depending on the value of various variables. A partial procedure summary can summarize less than all of the actions for a particular entry state (e.g., less than all the actions 720A). A plurality of partial procedure summaries can be generated for any one or more of the series of actions 720A-720N.

Example 12

Exemplary Partial Procedure Summaries

Figure 8:
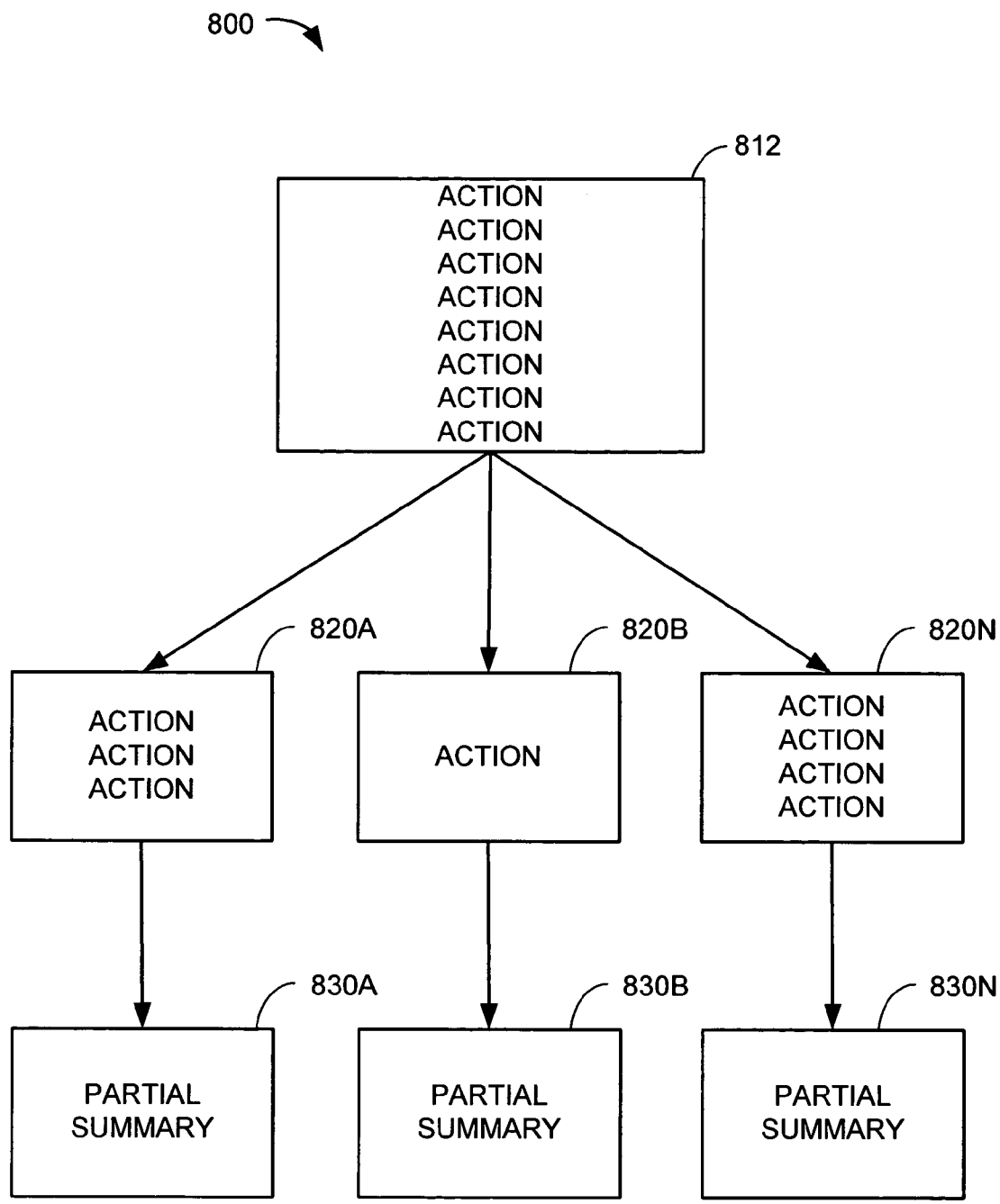
FIG. 8 is a block diagram showing exemplary partial procedure summaries based on actions of a procedure.

FIG. 8 shows exemplary partial procedure summaries based on a series of actions of a procedure. In the example, a series of actions 812 of a procedure has been divided into two or more subsets of actions 820A-820N. In the example, the subsets of actions are atomically modelable with respect to multithreaded execution of the procedure.

Atomic modelability can include the property that the actions can be modeled together without regard to possible interleaved actions from other threads. The actions can be deemed to have occurred one after the other without interruption by other threads. For example, a set of actions that are atomically modelable may be executable as a set. Regardless of whether actions from other threads execute during execution of the set, the resulting state will be the same. The software state can thus be accurately modeled by a procedure summary constructed from such actions even if the procedure is subject to interruption by other threads.

Based on the respective subsets of actions 820A-820N, respective partial procedure summaries 830A-830N can be generated. For example, the partial summary 830A can model the changes in state caused by execution of the actions 820A, and so on.

Example 13

Exemplary Modeling as Transactions

Based on the atomic modelability of a set of actions, the execution of a thread can be represented as a series of transactions. A transaction can be a series of actions which appear to execute atomically (e.g., performed until completion without interruption) to other threads. In some cases, a procedure can be summarized as a single transaction.

Example 14

Exemplary Method for Generating a Partial Procedure Summary

Figure 9:
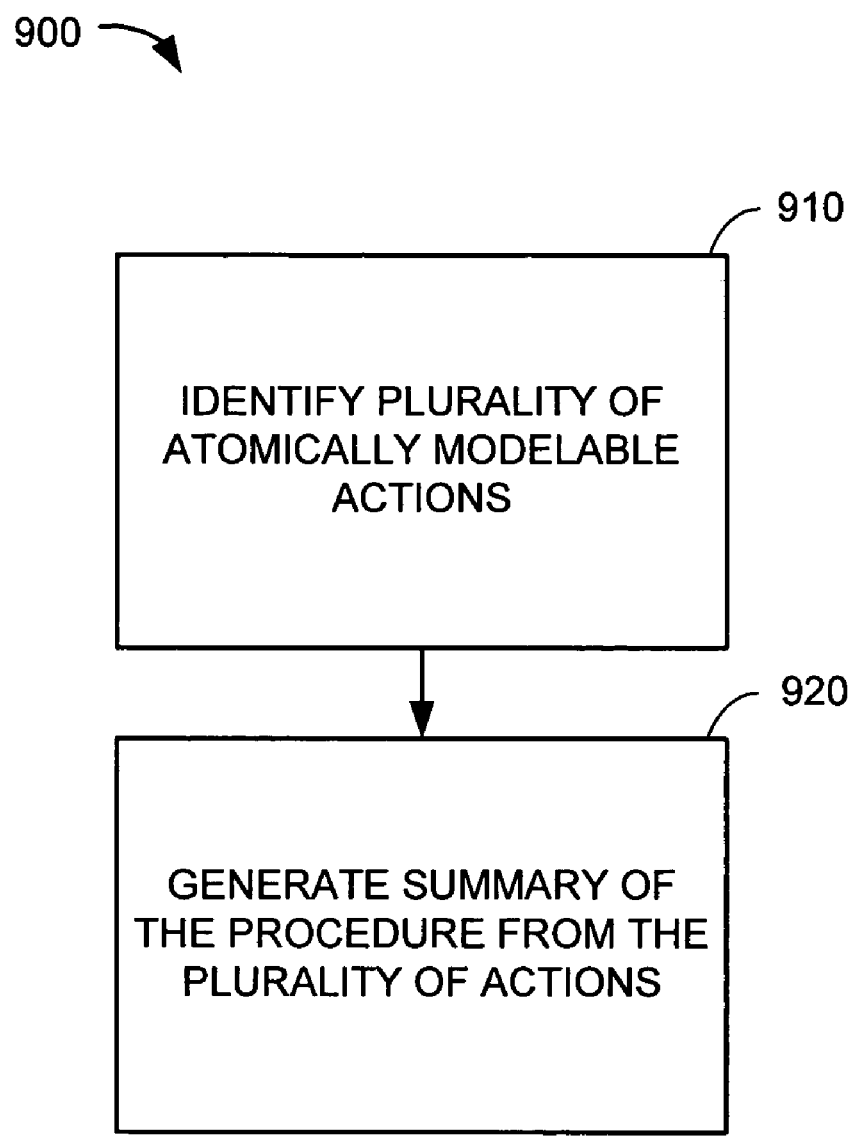
FIG. 9 is a flowchart showing an exemplary method for generating partial procedure summaries based on actions of a procedure.

FIG. 9 shows an exemplary method 900 for generating a partial procedure summary. At 910, a plurality of actions of the procedure that are atomically modelable with respect to multithreaded execution of the software are identified.

At 920, a procedure summary of the procedure is generated based on the plurality of atomically modelable actions. For example, a partial summary of the procedure can be generated.

Example 15

Exemplary Partial Procedure Summary Boundaries

Figure 10:
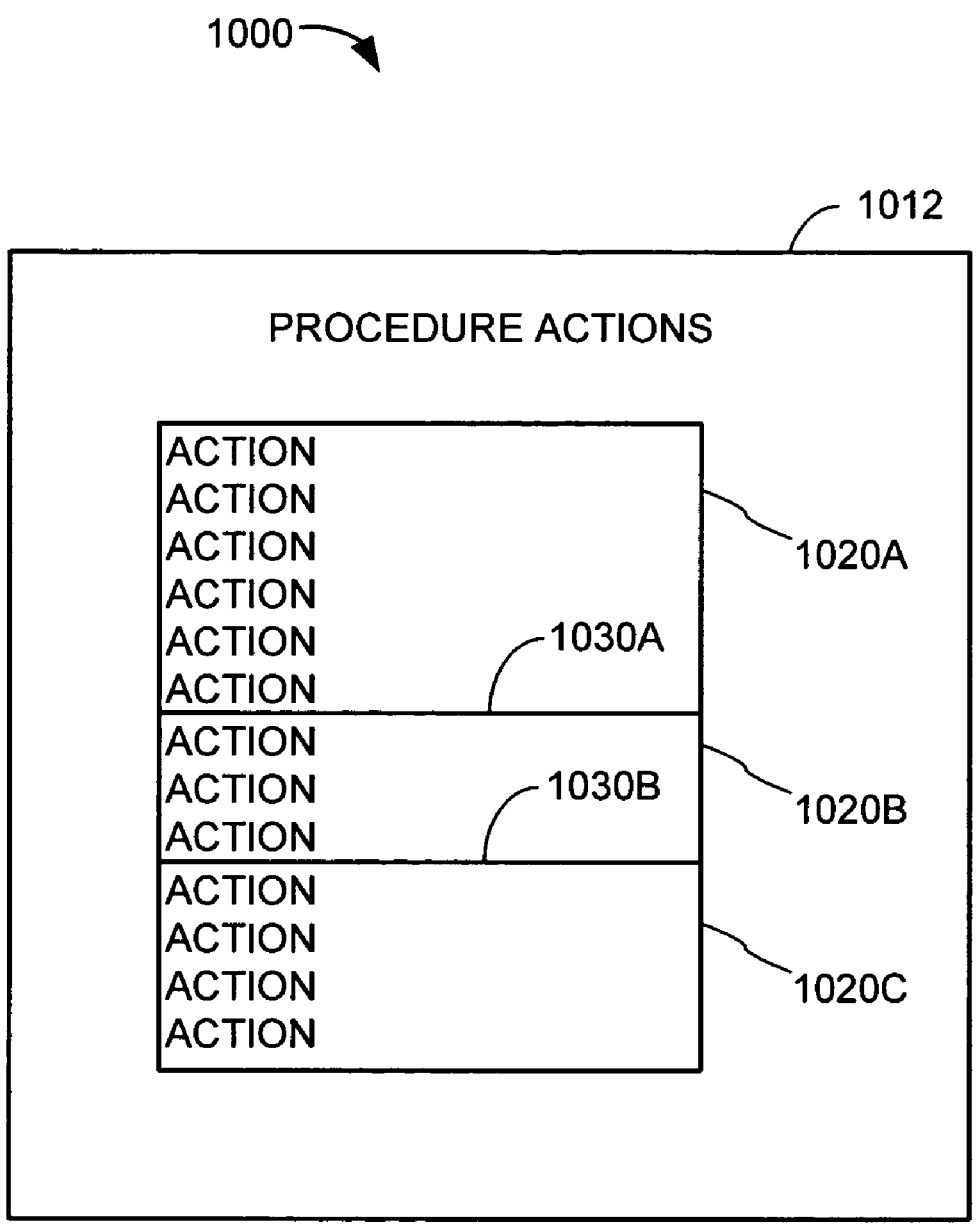
FIG. 10 is a block diagram showing exemplary summary boundaries for partial procedure summaries.

FIG. 10 shows an arrangement 1000 including the actions 1012 for a procedure to be summarized. In the example, the actions 1012 have been divided into two or more sets 1020A-1020C of successive actions based on the respective one or more boundaries 1030A-1030B.

As described herein, the boundaries 1030A-1030B can be chosen so that the procedure summaries accurately model the state of the software when executed in during multithreaded execution of the software (e.g., if the procedure 512 is subject to interruption by other threads). For example, boundaries can be chosen based on whether the sets of actions are atomically modelable with respect to multithreaded execution of the procedure actions. Boundaries can also be chosen based on transactions boundaries within the actions

Example 16

Figure 11:
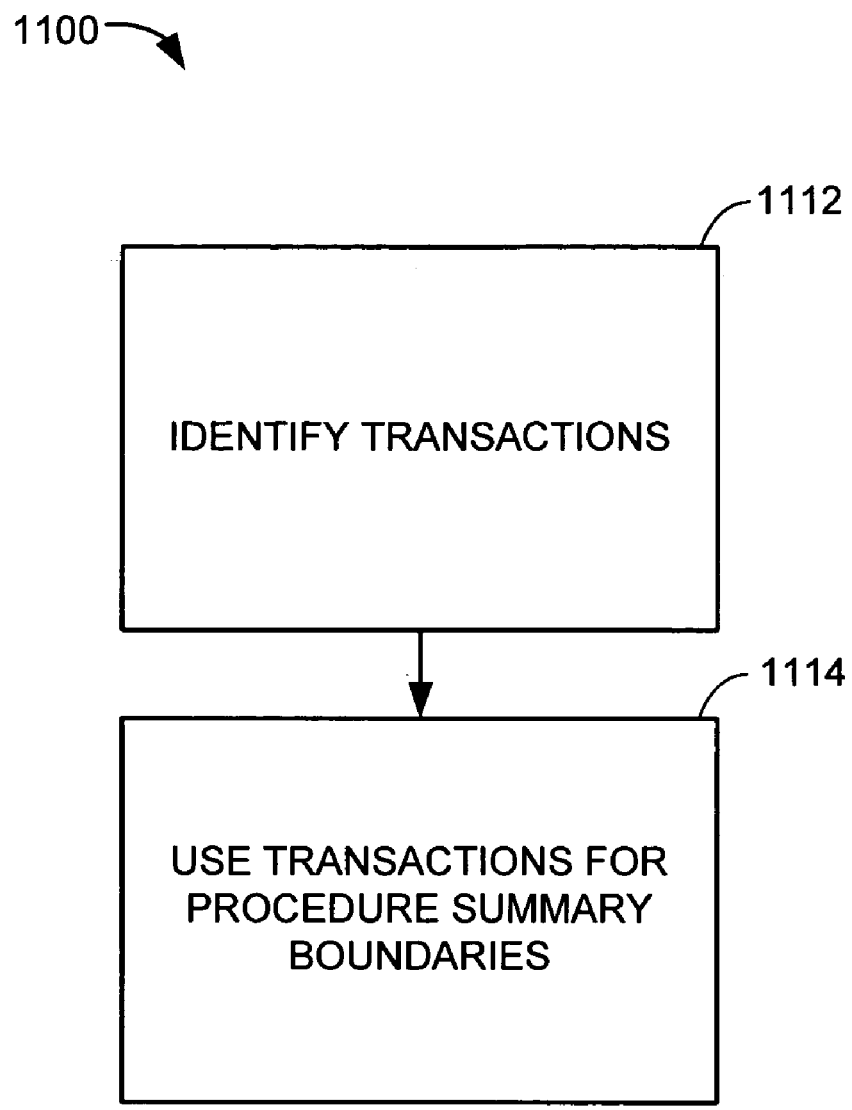
FIG. 11 is a flowchart showing an exemplary method for identifying partial procedure summary boundaries.

Exemplary Method for Determining Boundaries for Partial Procedure Summaries FIG. 11 shows an exemplary method 1100 for identifying partial procedure boundaries.

At 1100, transactions (e.g., sets of actions atomically modelable with respect to multithreaded execution of the software) within actions of a procedure are identified. At 1114, the transaction boundaries are used for partial procedure summary boundaries. For example, a partial procedure summary can be generated from the actions within the transaction.

Example 17

Exemplary Inclusion of Procedure Location in Summary

In any of the examples described herein, a procedure summary can include one or more indications of a location within the procedure. For example, the procedure summary can indicate an initial location and a resulting location in the procedure. In such a case, the summary summarizes actions for the procedure starting at the initial location and ending at the resulting location. In some cases, execution may loop, so it is possible for a resulting location to be before the initial location in the code. Such locations are sometimes called the "program counter" because they reflect a modeled value of a program counter executing the procedure.

Inclusion of the initial and resulting locations can help in piecing together partial summaries. In such a case, the initial and resulting locations may not correspond to the beginning or end of the procedure being summarized.

The program counter need not be stored separately from the state. For example, the program counter can be considered part of the state of the software (e.g., where within the procedure the program counter points).

Example 18

Exemplary Procedure Summary Format

A variety of formats can be used to represent a procedure summary (e.g., having the partial procedure summaries 530A-530N of FIG. 5) of multithreaded software. Any of the formats can be stored as a data structure on one or more computer readable media.

Figure 12:
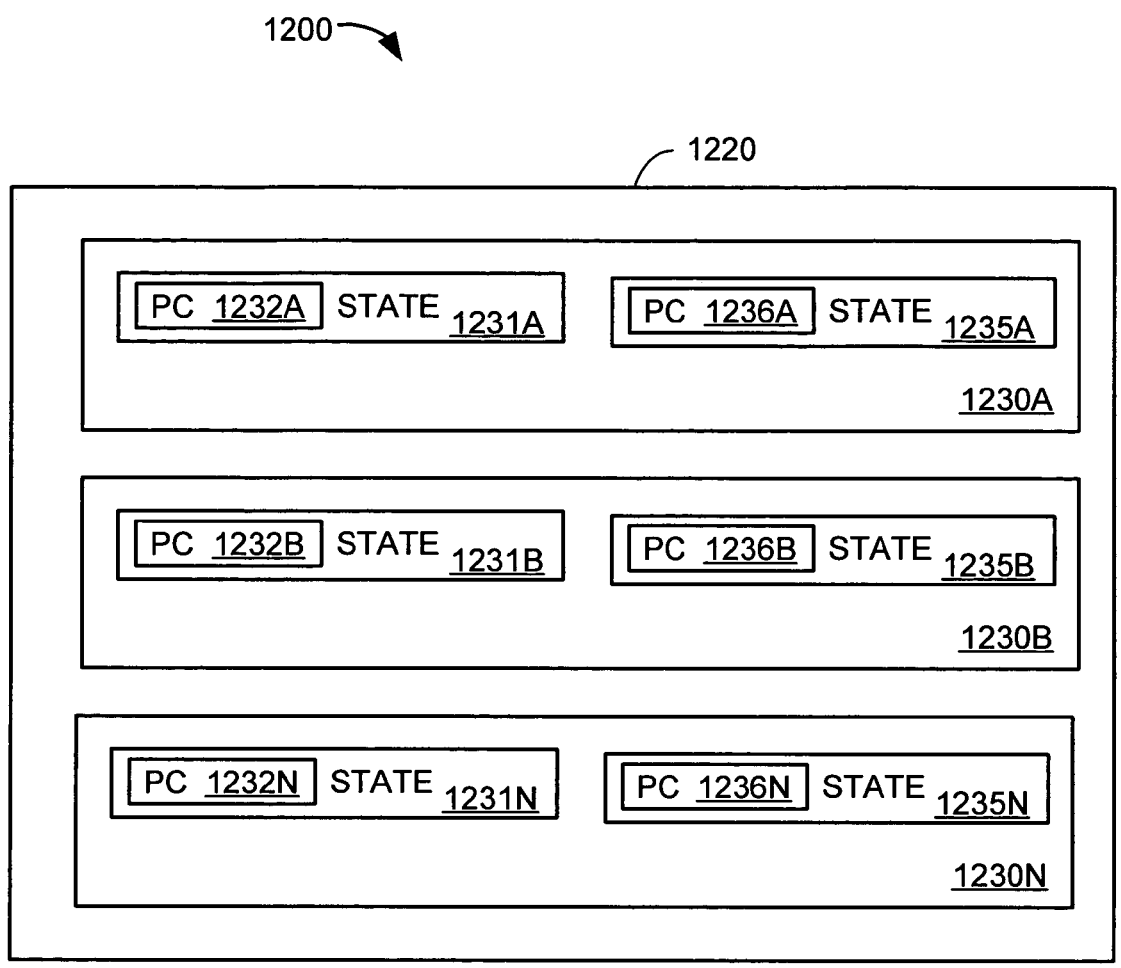
FIG. 12 is a block diagram showing an exemplary format for representing a partial procedure summary.

FIG. 12 shows an exemplary format 1200 for a procedure summary 1220. In the example, one or more state pairs 1230A-1230N are stored for the summary 1220. For a respective state pair (e.g., consider the state pair 1230A), an initial state 1231A and a resulting state 1235A can be stored. In addition, a starting program counter location 1232A can be stored for the initial state 1231A, and a resulting program counter location 1236A can be stored for the resulting state 1235A.

The state pair 1230A can be used to model execution for the procedure. If the modeled state of the software is the initial state 1231A at location 1232A within the procedure, then the state (or one of the possible states) of the software after execution of the modeled procedure or portion thereof will be the resulting state 1235A at location 1236A. Execution may continue within the procedure and be modeled by another state pair within the procedure summary 1220.

The procedure summary 1220 can include a plurality of partial procedure summaries summarizing different sets of actions for the procedure. A partial procedure summary for the same set of actions can include a plurality of state pairs to represent a plurality of initial states, a plurality of resulting states, or some combination thereof. However, in some cases, the procedure summary can summarize the entire procedure via a single state pair.

The procedure actions represented by a state pair can be determined according to any of the techniques described herein. For example, a plurality of actions atomically modelable with respect to multithreaded execution of the software can be identified. Boundaries between procedure actions can be chosen based on transaction boundaries as described herein.

Example 19

Exemplary Atomic Modelability

In any of the examples described herein, partial procedure summaries of a procedure of multithreaded software can be constructed from a set of actions in a procedure that are atomically modelable with respect to multithreaded execution of the software.

Example 20

Exemplary Efficiency via Partial Procedure Summaries

Procedure summaries result in more efficient analysis of software due to the phenomenon of summarization. Summarization can be applied as a technique to reduce the amount of computation needed to model execution of software. For example, a procedure summary may reflect a complex series of many actions in a procedure as a simple transition from one state to another.

Thus, as the number of actions modeled by the summary increases, the efficiency of the modeling process also increases.

Those actions identified as atomically modelable can be modeled by a single procedure summary. Thus, as the number of actions identified as atomically modelable increases, the efficiency of the modeling process can also increase. Such efficiency can result in increased scalability.

Example 21

Using Reduction (Movers) to Group Actions

In any of the examples described herein, a technique sometimes called "reduction" can be used when grouping actions into transactions. The technique is useful because it can be used to increase the number of actions represented in a transaction, resulting in a smaller number of transactions. As a result, the modeling techniques are more scalable (e.g., can be applied to larger programs).

Figure 13:
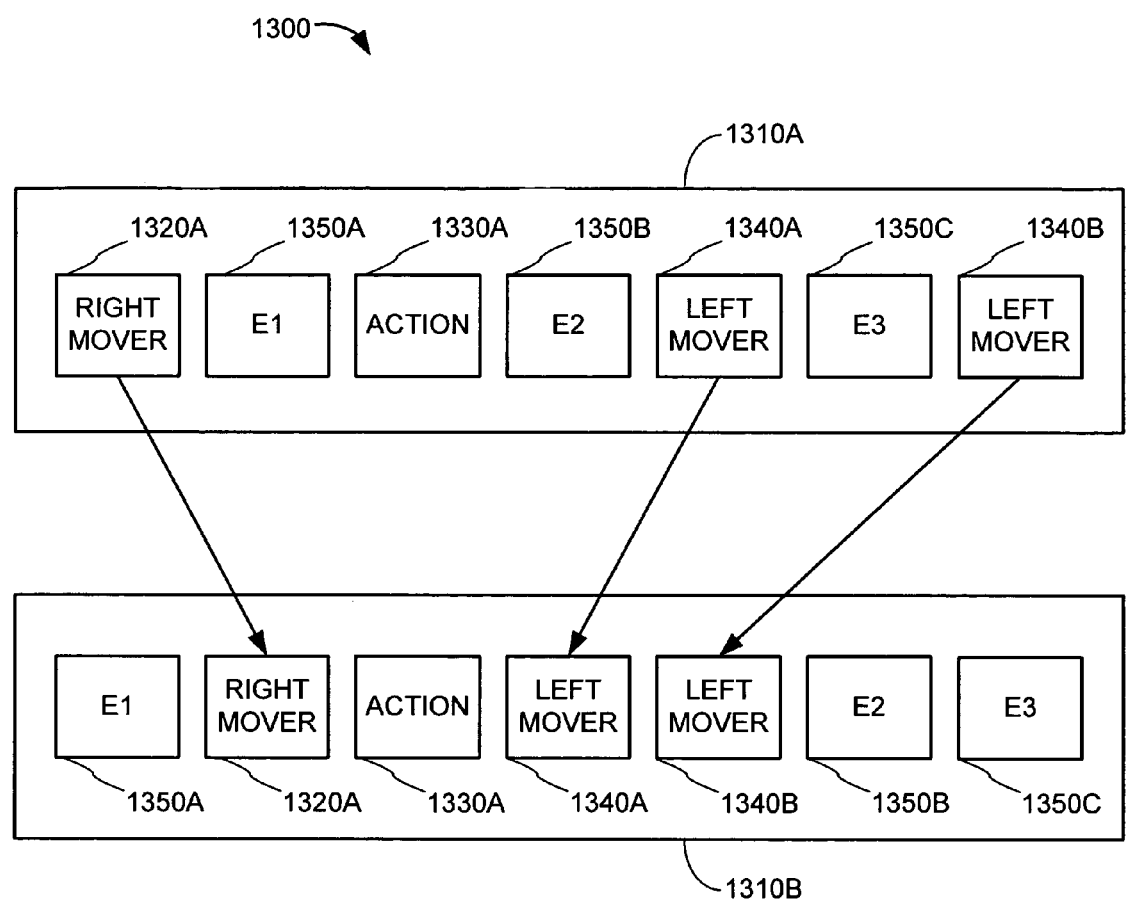
FIG. 13 is a block diagram showing an exemplary arrangement involving left movers and right movers.
Figure 14:
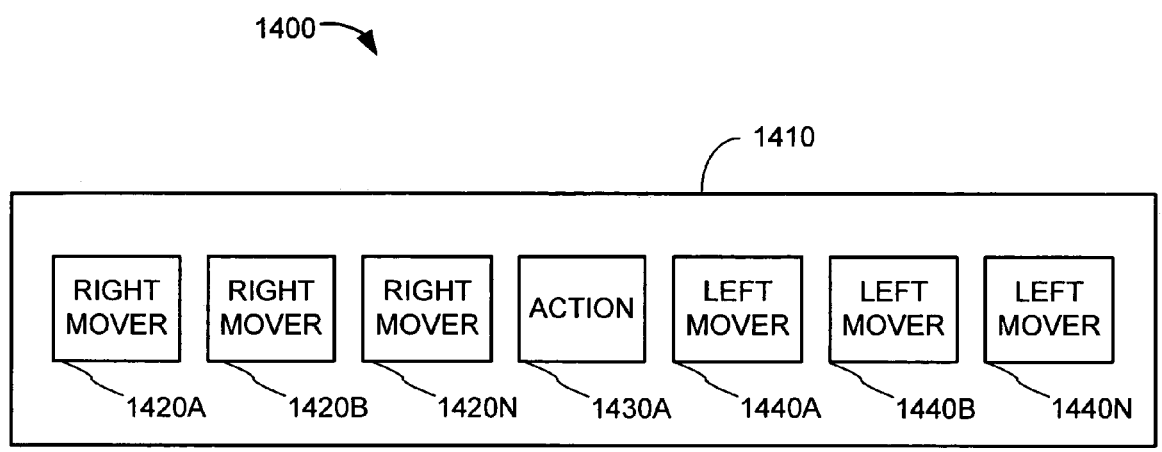
FIG. 14 is a block diagram showing an exemplary set of instructions included for computing a partial procedure summary based on the right and left mover status of the actions.

FIG. 13 shows an exemplary arrangement 1300 involving right and left movers. Right movers are actions that can be commuted to the right (e.g., moved later in time) of any action of another thread without affecting the resulting state. Thus, during modeling, the right mover can be modeled as occurring after any action of another thread. Conversely, left movers are actions that can be commuted to the left (e.g., moved earlier in time) of any action of another thread without affecting the resulting state. Thus, during modeling, the left mover can be modeled as occurring before any action of another thread.

In the example, a set of actions 1310A for a plurality of threads is shown. A first thread executes the actions right mover 1320A, action 1330A, left mover 1340A, and left mover 1340B. One or more other threads execute the actions $E_1$ 1350A, $E_2$ 1350B, and $E_3$ 1350C. In the example, the right mover action 1320A has been identified (e.g., by software) as a right mover, and the left mover actions 1340A and 1340B have been identified (e.g., by software) as left movers.

Based on applying the technique of right and left movers, when the actions are modeled, the right mover 1320A can be moved to the right of any action of any other thread until it abuts the action 1330A. Conversely, the left mover actions 1340A and 1340B can be moved to the left of any action of any other thread until they abut the action 1330A. As a result, the multithreaded execution of the actions shown in 1310A can be modeled as the actions shown in 1310B while still accurately modeling the resulting state of the software when executed in a multithreaded scenario. Accordingly, the actions 1320A, 1330A, 1340A, and 1340B are atomically modelable with respect to multithreaded execution of the software.

Thus choosing partial procedure boundaries for groups of actions atomically modelable with respect to multithreaded execution of the software can be based at least on the right mover and left mover status of the actions.

For example, for purposes of the procedure summaries, a set of actions atomically modelable with respect to multithreaded execution of the software can be determined using the arrangement 1400 shown in FIG. 1400.

In the example, a set of actions 1410 atomically modelable with respect to multithreaded execution of the software is found by identifying a set of zero or more right movers 1420A-1420N, followed by an action 1430A (e.g., which itself may be a right or left mover), followed by zero or more left movers 1440A-1440N. In practice, as shown, a plurality of right movers and a plurality of left movers may be included.

Figure 15:
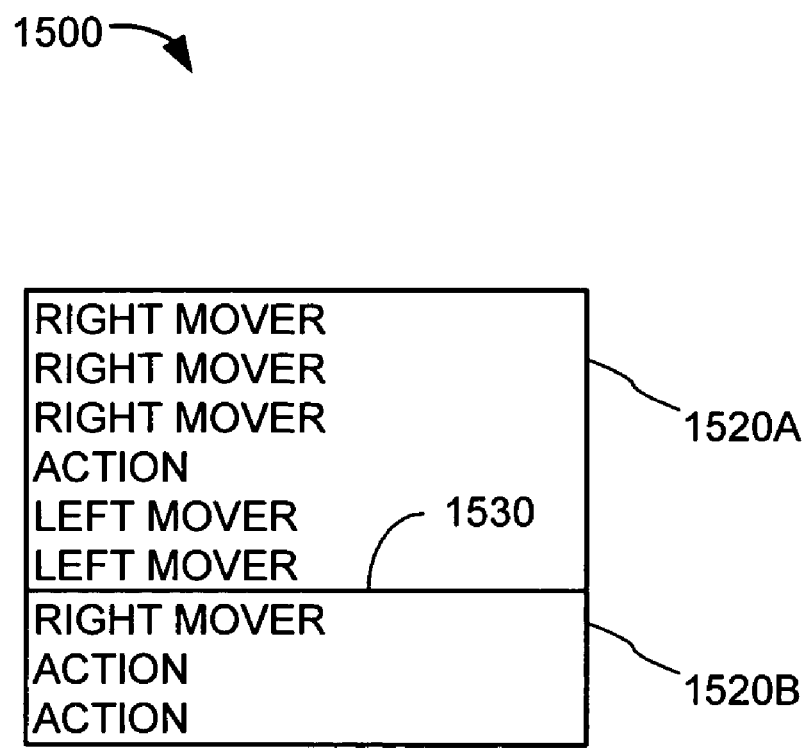
FIG. 15 is a block diagram showing an exemplary partial procedure summary boundary determined based on the left and right mover status of the actions.

If the set of actions 1410 is modeled as a transaction, determining the transaction boundaries can be determined as shown. For example, FIG. 15 shows an arrangement 1500 in which a transaction boundary 1530 has been found based on left and right mover status of the actions. In the example, two transactions were identified. The first transaction 1520A comprises three right movers, an action, and two left movers, the next transaction 1520B comprises a right mover followed by other actions. Additional boundaries are possible (e.g., following the boundary 1530).

Example 22

Exemplary Mover Status

The mover status for certain actions is easily determined. For example, the action acquire (m), where m is a mutex, is a right mover. Once it happens, there is no enabled action of another thread that may access m. Hence, the action can be commuted to the right of any action of another thread. The action release (m) is a left mover. At a point where it is enabled but has not happened, there is no enabled action of another thread that may access m. Hence, this action can be commuted to the left of any action of another thread.

Any action that accesses only local variables or shared variables protected by locks during the action is both a left mover and a right mover, since such action can be commuted both to the left and to the right of actions by other threads. Any action that accesses a shared variable is both a left mover and a right mover, as long as the threads acquire a fixed mutex before accessing the variable.

Example 23

Exemplary Method for Grouping Actions Based on Mover Status

Figure 16:
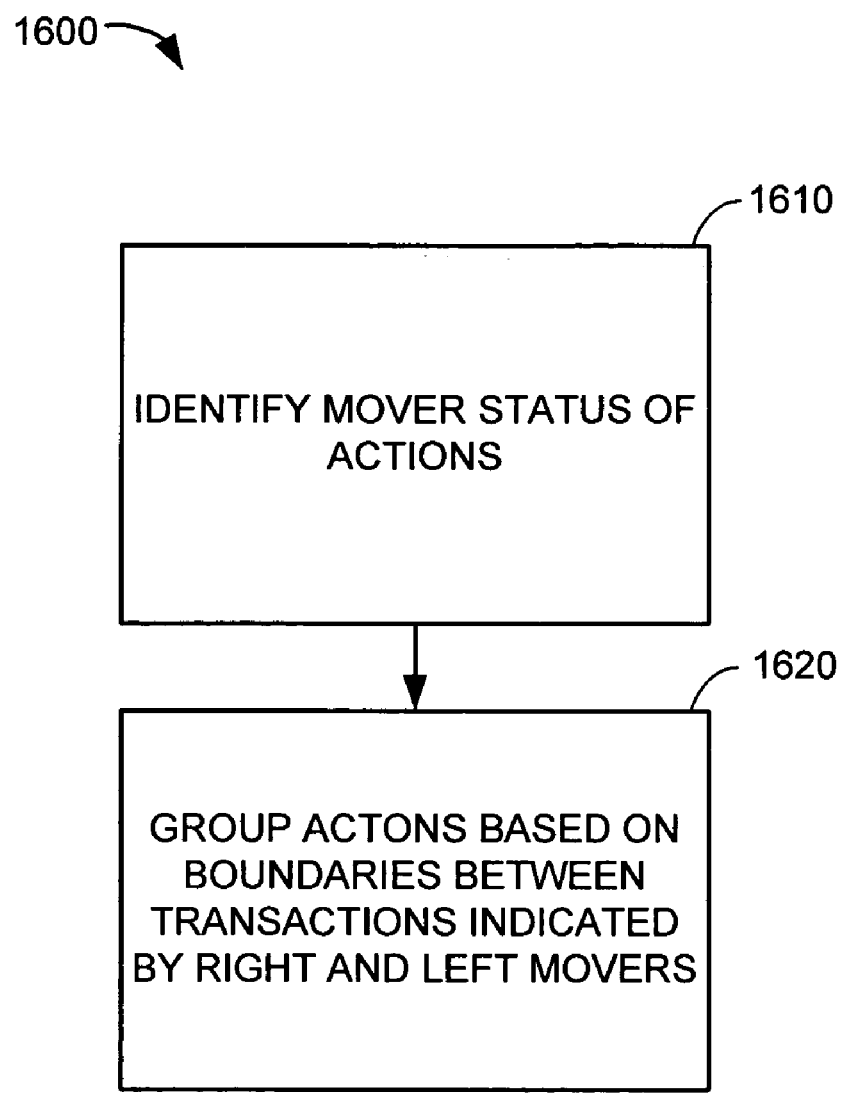
FIG. 16 is a flowchart showing an exemplary method for identifying actions atomically modelable with respect to multithreaded execution of the actions via the mover status of the actions.

FIG. 16 shows an exemplary method 1600 for identifying actions atomically modelable with respect to multithreaded execution of the actions via the mover status of the actions. For example, the method 1600 can be used to implement box 910 of FIG. 9.

At 1610, the mover status of the actions is identified. Software can analyze the actions to determine if they are left or right movers. In some cases, an action may be neither a left or right mover. Additionally, an action can be both a left and a right mover.

At 1620, the actions are grouped based on boundaries between the transactions indicated by the left and right movers. For example, when a right mover follows a left mover, a boundary between the two is indicated. Such actions within the boundaries are atomically modelable with respect to the multithreaded execution of the procedure having the actions.

Example 24

Exemplary Phase Variable

A transaction can be defined as a sequence of right movers, followed by a single atomic action, followed by a sequence of left movers. A transaction can be tracked by using two states: pre-commit or post-commit. A transaction starts in the pre-commit state and stays in the pre-commit state as long as right movers are being executed.

In order to track the phase of a thread's transaction when execution of the thread is modeled, a modeled variable local to the procedure can be stored. Such a variable can be called a phase variable. For example, the phase variable can reflect that the thread is in the pre-commit or post-commit part of a transaction.

A thread can be considered to be in the pre-commit part of the transaction as long as it is executing right movers. After the atomic action (with no restrictions) is executed, the transaction can move to the post-commit state. The transaction stays in the post-commit state as long as left movers are being executed until the transaction completes.

The phase variable can be implemented as a Boolean variable, indicating True for pre-commit and False otherwise. The variable can then be watched. When it moves from True to False, a transaction boundary is indicated. Such a boundary can be used when identifying the actions atomically modelable with respect to multithreaded execution of the software.

Example 25

Exemplary Use of Flaw Indicated Variable

In order to track when a programming flaw has been detected by the modeling software, a variable local to the thread (e.g., "wrong") can track whenever an assertion fails. After the assertion fails, the failing thread can be prevented from making any other transitions (e.g., modeled execution for the thread stops).

Example 26

Exemplary Procedure Summary

Procedure summaries can reflect that when a given procedure is called in some state s, the procedure exits in a state s'. A procedure summary can be a collection of the possibilities that can occur given a procedure, possible input(s), and possible output(s). The use of procedure summaries provides reuse and avoids wasteful computation. Consider the following procedure P:

```
add(int x, int y){
    int z;
    z = x + x;
    z = z + 2y;
    return z;
}
```

If the procedure P is called with x=1 and y=2, then the procedure P will exit by returning z=6. In other words, an entry of a procedure summary for P where x=1 and y=2 could be specified as (1, 2, 6). An entry of the procedure summary for P where x=2 and y=1 could be specified as (2, 1, 6), and so on.

Example 27

Sample Case 1 of a Summarization-Based Model Checking Technique

The following four sample cases illustrate different approaches for performing model checking. A model checker can implement any combination of the sample cases. The first case illustrates a simple case where the transaction boundary and the procedure boundary coincide. Consider the following resource allocation routine:

```
bool available[N];
mutex m;
int getResource( ) {
    int i = 0;
L0: acquire(m);
L1: while (i < N) {
L2:     if (available[i]) {
L3:         available[i] = false;
L4:         release(m);
L5:         return i;
        }
L6:     i++;
    }
L7: release (m);
L8: return i;
}
```

There are N shared resources numbered 0, . . . , N−1. The j-th entry in the global Boolean array available is true iff the j-th resource is free to be allocated. A mutex m is used to protect accesses to available. The mutex m has the value 0 when free, and 1 when locked. The body of getResource acquires the mutex m, and then searches for the first available resource. If a free resource is found at index i, it sets available[i] to false and releases the mutex. If no free resource is found, then it releases the mutex. In both cases, it returns the final value of i. Thus, the returned value is the index of a free resource if one is available; otherwise, it is N. There is a companion procedure freeResource for freeing an allocated resource (not shown above). Multithreaded programs might include a number of threads that non-deterministically call getResource and freeResource.

Since acquire (m) is a right mover, release (m) is a left mover, and all other actions in getResource are both right and left movers, the entire procedure is contained in a single transaction. Suppose N=2 and $\langle a_0', a_1' \rangle$ denotes the contents of available, where $a_0$ and $a_1$ denote the values of available[0] and available[1], respectively. The summary of getResource consists of a set of edges of the form (pc, i, m, $\langle a_0, a_1 \rangle$)$\mapsto$(pa', i', m', $\langle a_0', a_1' \rangle$), where the tuple (pc, i, m, $\langle a_0, a_1 \rangle$) represents the values of the program counter and variables i, m, and available in the pre-store of the transaction and the tuple (pc', i', m', $\langle a_0', a_1' \rangle$) denotes the corresponding values in the post-store of the transaction. The computed summary of getResource consists of the following edges:

(L0, 0, 0, $\langle 0, 0 \rangle$)$\mapsto$(L8, 2, 0, $\langle 0, 0 \rangle$)
(L0, 0, 0, $\langle 0, 1 \rangle$)$\mapsto$(L5, 1, 0, $\langle 0, 0 \rangle$)
(L0, 0, 0, $\langle 1, 0 \rangle$)$\mapsto$(L5, 0, 0, $\langle 0, 0 \rangle$)
(L0, 0, 0, $\langle 1, 1 \rangle$)$\mapsto$(L5, 0, 0, $\langle 0, 1 \rangle$)

All of the edges in this summary begin at the label L0 and terminate at one of two labels (L8 or L5), both of which are labels at which getResource returns. Thus, the summary matches the intuition that the procedure body is just one transaction. The first edge summarizes the case when no resource is allocated; the remaining three edges summarize the case when some resource is allocated. There is no edge beginning in a state with m=1 since, from such a state, the execution of the transaction blocks. Once this summary has been computed, if any thread calls getResource, the summary can be used to compute the state at the end of the transaction, without reanalyzing the body of getResource, thus providing reuse and scalability.

Example 28

Sample Case 2 of a Summarization-Based Model Checking Technique

The second case illustrates summarization where a procedure body contains several transactions inside of it. Consider the following modified version of the resource allocator of Case 1:

```
bool available[N];
mutex m;
int getResource( ) {
    int i = 0;
L0: while (i < N) {
L1:     acquire(m[i]);
L2:     if (available[i]) {
L3:         available[i] = false;
L4:         release(m[i]);
L5:         return i;
        } else {
L6:         release m[i];
        }
```

```
L7:     i++;
    }
L8: return i;
}
```

The locking has been made more fine-grained through the use of an array m of mutexes and by protecting the j-th entry in available with the j-th entry in m. Now, the body of the procedure getResource is no longer contained entirely in a single transaction. In fact, there is one transaction corresponding to each iteration of the loop inside of it. Again, suppose N=2. Now the summary contains edges of the form (pc, i, $\langle m_0, m_1 \rangle$, $\langle a_0, a_1 \rangle$)$\mapsto$(pc', i', $\langle (m_0', m_1') \rangle$, $\langle a_0', a_1' \rangle$), where $\langle m_0, m_1 \rangle$ denotes the contents of m in the pre-store and !$m_0'$, $m_1'$⟩ denotes the contents of m in the post-store. The computed summary of getResource consists of the following edges:

(L0, 0, $\langle 0, 0 \rangle$, $\langle 0, 0 \rangle$)$\mapsto$(L1, 1, $\langle 0, 0 \rangle$, $\langle 0, 0 \rangle$)
(L0, 0, $\langle 0, 0 \rangle$, $\langle 0, 1 \rangle$)$\mapsto$(L1, 1, $\langle 0, 0 \rangle$, $\langle 0, 1 \rangle$)
(L0, 0, $\langle 0, 0 \rangle$, $\langle 1, 0 \rangle$)$\mapsto$(L5, 0, $\langle 0, 0 \rangle$, $\langle 0, 0 \rangle$)
(L0, 0, $\langle 0, 0 \rangle$, $\langle 1, 1 \rangle$)$\mapsto$(L5, 0, $\langle 0, 0 \rangle$, $\langle 0, 1 \rangle$)
(L1, 1, $\langle 0, 0 \rangle$, $\langle 0, 0 \rangle$)$\mapsto$(L8, 2, $\langle 0, 0 \rangle$, $\langle 0, 0 \rangle$)
(L1, 1, $\langle 0, 0 \rangle$, $\langle 0, 1 \rangle$)$\mapsto$(L5, 1, $\langle 0, 0 \rangle$, $\langle 0, 0 \rangle$)
(L1, 1, $\langle 0, 0 \rangle$, $\langle 1, 0 \rangle$)$\mapsto$(L8, 2, $\langle 0, 0 \rangle$, $\langle 1, 0 \rangle$)
(L1, 1, $\langle 0, 0 \rangle$, $\langle 1, 1 \rangle$)$\mapsto$(L5, 1, $\langle 0, 0 \rangle$, $\langle 1, 0 \rangle$)

This summary contains three kinds of edges. The first two edges correspond to the transaction that starts at the beginning of the procedure, i.e., at label L0 with i=0, goes through the loop once, and ends at L1 with i=1. The next two edges correspond to the transaction that again starts at the beginning of the procedure, but ends with the return at label L5 during the first iteration through the loop. The last four edges correspond to the transaction that starts in the middle of the procedure at label L1 with i=1, and returns either at label L5 or L8. The edges of the first and third kind did not exist in the summary of the previous version of getResource, where all edges went from entry to exit.

Example 29

Sample Case 3 of a Summarization-Based Model Checking Technique

The third case illustrates that the analysis can terminate and validate the program assertions even in the presence of unbounded recursion. Consider the following:

```
int g = 0;
mutex m;
void foo(int r) {                void main( ) {
L0: if (r == 0) {                    int q = choose({ 0,1});
L1:     foo(r);                  M0:     foo(q);
    } else {                     M1:     acquire(m);
L2:     acquire(m);              M2:     assert(g >= 1);
L3:     g++;                     M3:     release(m);
L4:     release(m);              M4:     return;
    }                            }
L5: return;
}
P = { main( ) } || { main( ) }
```

Program P consists of two threads, each of which starts execution by calling the main procedure. The main procedure has a local variable q which is initialized non-deterministically. Then main calls foo with q as the actual parameter. The procedure foo has an infinite recursion if the parameter r is 0. Otherwise, it increments global g and returns. After returning from foo, the main procedure asserts that (g>=1). All accesses to the shared global g are protected by a mutex m. The initial value of g is 0.

The stack can grow without bound due to the recursion in procedure foo. Hence, naïve model checking does not terminate on this case. However, the body of foo consists of one transaction, since all action sequences in foo consist of a sequence of right movers followed by a sequence of left movers. A summary edge for foo is of the form (pc, r, m, g)↦ (pc', r', m', g'), whose meaning is similar to that of a summary edge in the previous cases. The summary for foo consists of the following edges:

(L0, 1, 0, 0)↦(L5, 1, 0, 1)
(L0, 1, 0, 1)↦(L5, 1, 0, 2)

There is no edge beginning in a state with r=0 since, from such a state, the execution of the transaction never terminates. Using summaries, reasoning about the stack explicitly inside of foo and exploring the unbounded recursion in foo are both avoided.

The body of main has two transactions. The first transaction begins at label M0 and ends at label M1, consisting primarily of the call to foo. The second transaction begins at label M1 and ends at label M4. A summary edge for main has the form (pc, q, m, g)↦(pc', q', m', g'). The summary for main consists of the following edges:

(M0, 1, 0, 0)↦(M1, 1, 0, 1)
(M0, 1, 0, 1)↦(M1, 1, 0, 2)
(M0, 1, 0, 1)↦(M4, 1, 0, 1)
(M0, 1, 0, 2)↦(M4, 1, 0, 2)

Using the above summaries for procedures foo and main, the model checking analysis is able to terminate and correctly conclude that P is free of assertion violations. The analysis can begin with an empty stack for each thread. When a thread calls main, since the body of main is not contained within one transaction, the analysis pushes a frame for main on the stack of the calling thread. However, when a thread calls foo, no frame corresponding to foo is pushed since the entire body of foo is contained within a transaction. Instead, foo is summarized and its summary is used to assist with the model checking.

Example 30

Sample Case 4 of a Summarization-Based Model Checking Technique

The fourth case illustrates a summarization technique for a procedure that is called from different transactional contexts. Consider the following:

```
int gm = 0, gn = 0;
mutex m, n;
void bar( ) {
N0:   acquire(m);
N1:   gm++;
N2:   release(m);
}
void foo1( ) {              void foo2( ) {
L0:   acquire(n);           M0:   acquire(n);
L1:   gn++;                 M1:   gn++;
L2:   bar( );               M2:   release(n);
L3:   release(n);           M3:   bar( );
```

-continued

```
L4:   return;               M4:   return;
}                           }
P = { foo1( ) } || { foo2( ) }
```

Two shared variables, gm and gn, are protected by mutexes m and n, respectively. Procedure bar accesses the variable gm, and is called from two different procedures foo1 and foo2. In foo1, the procedure bar is called from the pre-commit state of the transaction, since no mutexes are released prior to calling bar. In foo2, the procedure bar is called from the post-commit state of the transaction, since mutex n is released prior to calling bar. The summary for bar needs to distinguish these two calling contexts. In the case of the call from foo1, the entire body of foo1, including the call to bar, is part of the same transaction. In the case of the call from foo2, there are two transactions, one from label M0 to M3, and another from label M3 to M4. These two calling contexts are distinguished by instrumenting the semantics of the program with an extra bit of information that records the phase of the transaction. Then, each summary edge provides the pre- and post-values not only of program variables but also of the transaction phase.

Example 31

Exemplary Analysis of Store of a Multithreaded Program

For purposes of illustration, the store of a multithreaded program is partitioned into the global store Global and the local store Local of each thread (see Table 1). The set Local of local stores has a special store called wrong. The local store of a thread moves to wrong on failing an assertion and thereafter the failed thread does not make any other transitions.

TABLE 1

Domains of a Multithreaded Program

| | | |
|---|---|---|
| t, u | ∈ Tid | = {1, . . . ,n} |
| ge | ∈ Global | |
| l | ∈ Local | |
| ls | ∈ Locals | = Tid → Local |
| f | ∈ Frame | |
| s | ∈ Stack | = Frame* |
| ss | ∈ Stacks | = Tid → Stack |
| State = | | Global × Locals × Stacks |

A multithreaded program $(g_0, ls_0, T, T^+, T^-)$ consists of five components. $g_0$ is the initial value of the global store. $ls_0$ maps each thread id $t \in Tid$ to the initial local store $ls_0(t)$ of thread t. The behavior of the individual threads may be modeled through use of the following three relations:

$T \subseteq Tid \times (Global \times Local) \times (Global \times Local)$ $T^+ \subseteq Tid \times Local \times (Local \times Frame)$ $T^- \subseteq Tid \times (Local \times Frame) \times Local$ The relation T models thread steps that do not manipulate the stack. The relation $T(t, g, l, g', l')$ holds if thread t can take a step from a state with global store g and local store l, yielding (possibly modified) stores g' and l'. The stack is not accessed or updated during this step. The relation $T^+(t, l, l', f)$ models steps of thread t that push a frame onto the stack. Similarly, the relation $T^-(t, l, f, l')$ models steps of thread t that pop a frame from the stack. This step also does not access the global store, is enabled when the local store is l, updates the local store to l', and pops the frame f from the stack.

The program starts execution from the state $(g_0, ls_0, ss_0)$ where $ss_0(t)=\epsilon$ for all $t \in Tid$. At each step, any thread may make a transition. The transition relation $\rightarrow_t \subseteq State \times State$ of thread t is defined below. For any function h from A to B, $a \in A$ and $b \in B$, $h[a:=b]$ denotes a new function such that $h[a:=b](x)$ evaluates to $h(x)$ if $x \neq a$, and to b if $x=a$.

TABLE 2

Transition relation $\rightarrow_t$ $$\frac{T(t, g, ls(t), g', l')}{(g, ls, ss) \rightarrow_t (g', ls[t := l'], ss)}$$

$$\frac{T + (t, ls(t), l', f)}{(g, ls, ss) \rightarrow_t (g, ls[t := l'], ss[t := ss(t), f])}$$

$$\frac{ss(t) = s \cdot f \quad T - (t, ls(t), f, l')}{(g, ls, ss) \rightarrow_t (g, ls[t := l'], ss[t := s])}$$

The transition relation $\rightarrow \subseteq State \times State$ of the program is the disjunction of the transition relations of the various threads.

$$\rightarrow = \exists t. \rightarrow_t$$

Example 32

Exemplary Transaction using the Theory of Movers

Referring back to FIG. 13, particular actions can be used to illustrate the theory of movers. Suppose a thread performs the following sequence of four operations: (1) acquires a lock (1320A is an acq operation), (2) reads a variable x protected by that lock into a local variable t (1330A is the action t=x), (3) updates the variable (1340A is the action x=t+1), and (4) releases the lock (1340B is the action rel). Suppose that the actions of this method are interleaved with arbitrary actions $E_1$ 1350A, $E_2$ 1350B, $E_3$ 1350C of other threads. It is assumed that the environment actions respect the locking discipline of accessing x only after acquiring the lock.

As discussed above, the acquire operation is a right mover. Therefore, it can be commuted to the right of the environment action $E_1$ without changing the final state $s_3$, even though the intermediate state changes from $s_2$ to $s_2'$. Similarly, the write and release operations are left movers and are commuted to the left of environment actions $E_2$ and $E_3$. Finally, after performing a series of commute operations, the execution at the bottom of the diagram occurs, in which the actions of the first thread happen without interruption from the environment. Note that in this execution the initial and final states are the same as before. Thus, the sequence of operations performed by the first thread constitutes a transaction. The transaction is in the pre-commit state before the action 1330A and in the post-commit state afterwards.

Example 33

Exemplary Model Checking with Reduction

Consider a situation where RM, $LM \subseteq T$ are subsets of a transition relation T with the following two properties for all $t \neq u$:

1. If $RM(t, g_1, l_1, g_2, l_2)$ and $T(u, g_2, l_3, g_3, l_4)$, there is $g_4$ such that $T(u, g_1, l_3, g_4, l_4)$ and $RM(u, g_1, l_3, g_4, l_4)$. Further, $RM(u, g_2, l_3, g_3, l_4)$ iff $RM(u, g_1, l_3, g_4, l_4)$, and $LM(u, g_2, l_3, g_3, l_4)$ iff $LM(u, g_1, l_3, g_4, l_4)$.
2. If $T(u, g_1, l_1, g_2, l_2)$ and $LM(t, g_2, l_3, g_3, l_4)$, there is $g_4$ such that $LM(t, g_1, l_3, g_4, l_4)$ and $T(u, g_4, l_1, g_3, l_2)$. Further, $RM(u, g_1, l_1, g_2, l_2)$ iff $RM(u, g_4, l_1, g_3, l_2)$, and $LM(u, g_1, l_1, g_2, l_2)$ iff $LM(u, g_4, l_1, g_3, l_2)$.

The first property states that a right mover action in thread t commutes to the right of an action of a different thread u. Moreover, the action by thread u is a right mover (respectively for left movers) before the commute operation iff it is a right mover (respectively for left movers) after the commute operation. Similarly, the second property states the requirement on a left mover in thread t. This analysis is parameterized by the values of RM and LM and only requires that they satisfy these two properties. The larger the relations RM and LM, the longer the transactions this analysis infers. Therefore, these relations should be as large as possible in practice.

As discussed previously, a transaction is a sequence of right movers followed by a single action followed by a sequence of left movers. In order to minimize the number of explored interleavings and the maximize reuse, transactions that are as long as possible should be inferred. In order to implement this inference, a Boolean local variable should be introduced in each thread to keep track of the phase of that thread's transaction. Note that this instrumentation is done automatically by the analysis (and thus not by the programmer). The phase variable of thread t is true if thread t is in the right mover (or pre-commit) part of the transaction; otherwise the phase variable is false. In other words, the transaction commits when the phase variable moves from true to false. The initial value of the phase variable for each thread is true.

p, p' $\in$ Boolean
l, l' $\in$ Local$^\#$ = Local $\times$ Boolean
ls, ls' $\in$ Locals$^\#$ = Tid $\rightarrow$ Local$^\#$ The initial value of the global store of the instrumented program remains $g_0$. The initial value of the local stores changes to $ls_0$, where $ls_0(t) = !ls_0(t)$, true) for all $t \in Tid$. The transition relation T. $T^+$, $T^-$ is instrumented to generate new transition relations U, $U^+$, $U^-$ that update the phase appropriately.

$U \subseteq Tid \times (Global \times Local^\#) \times (Global \times Local^\#)$ $U^+ \subseteq Tid \times Local^\# \times (Local^\# \times Frame)$ $U^- \subseteq Tid \times (Local^\# \times Frame) \times Local^\#$ $U(t,g,(l,p),g',(l',p')) \underline{def}$ $\wedge T(t,g,l,g',l')$ $\wedge p' = (RM(t,g,l,g',l') \wedge (p \vee \neg LM(t,g,l,g',l')))$ $U+(t,(l,p),(l',p'),f) \underline{def}$ $\wedge T+(t,l,l',f)$ $\wedge p' = p$ $U-(t,(l,p),f,(l',p')) \underline{def}$ $\wedge T-(t,l,f,l')$ $\wedge p' = p$ In the definition of U, the relation between p' and p reflects the intuition that if p is true, then p' continues to be true as long as it executes right mover actions. The phase changes to false as soon as the thread executes an action that is not a right mover. Thereafter, it remains false as long as the thread executes left movers. Then, it becomes true again as soon as the thread executes an action that is a right mover and not a left mover.

TABLE 3

Ruleset 1: Model checking with reduction (INIT)

$$\sum (g_0, ls_0, ss_0)$$

(STEP)

$$\frac{\forall u \neq t \cdot N(u \cdot g \cdot ls(u))}{\sum (g', ls[t := l'], ss)} \sum (g \cdot ls \cdot ss) U(t, g, ls(t), g', l')$$

(PUSH)

$$\frac{\forall u \neq t \cdot N(u, g, ls(u))}{\sum (g, ls[t := l'], ss[t := ss(t) \cdot f])} \sum (g, ls, ss) U + (t, ls(t), l', f)$$

(POP)

$$\frac{\forall u \neq t \cdot N(u, g, ls(u))}{\sum (g, ls[t := l'], ss[t := s])} \sum (g, ls, ss) U - (t, ls(t), f, l') ss(t) = s \cdot f$$

For each thread t, three sets are defined:
$\mathcal{R}(t), \mathcal{L}(t), \mathcal{N}(t) \subseteq \text{Global} \times \text{Local}^\#$ These sets respectively define when a thread is executing in the right mover part of a transaction, the left mover part of a transaction, and outside any transaction. For example, in the execution of FIG. 1, let t be the identifier of the thread executing the transaction. Then, the states $\{s_2, s_3\} \in R(t)$, $(s_4, s_5, s_6, s_7) \in L(t)$, and $\{s_1, s_8\} \in N(t)$. These three sets can be any partition of (Global×Local$^\#$) satisfying the following two conditions:

$$R(t) \subseteq \{(g, \langle l, p \rangle) \| l \notin \{ls_0(t), \text{wrong}\} \wedge p\} \quad \text{C1.}$$

$$L(t) \subseteq \left\{ (g, \langle l \cdot p \rangle) \middle| \begin{array}{l} l \notin \{ls_0(t), \text{wrong}\} \wedge \neg p \wedge \\ \forall g', l' \cdot T(t, g, l, g', l') \\ \Rightarrow LM(t, g, l, g', l') \end{array} \right\}.$$

Condition C1 says that thread t is in the right mover part of a transaction only if the local store of t is neither its initial value nor wrong and the phase variable is true. Condition C2 says that thread t is in the left mover part of a transaction only if the local store of t is neither its initial value nor wrong, the phase variable is false, and all possible enabled transitions are left movers. Since ($\mathcal{R}(t), \mathcal{L}(t), \mathcal{N}(t)$) is a partition of (Global×Local$^\#$), once $\mathcal{R}(t)$ and $\mathcal{L}(t)$ have been picked according to C1 and C2, the set $\mathcal{N}(t)$ is implicitly defined.

$\mathcal{R}(t, g, l)$ is written whenever $(g,l) \in \mathcal{R}(t)$, $\mathcal{N}(t, g, l)$ whenever $(g, l) \in \mathcal{N}(t)$, and $\mathcal{N}(t, g, l)$ whenever $(g, l) \in \mathcal{N}(t)$. Finally, using the values of $\mathcal{N}(t)$ for all t∈Tid, the multithreaded program is model checked by computation of the least fixpoint of the set of rules in Ruleset 1. The model checking analysis schedules a thread only when no other thread is executing inside a transaction.

In the example, Conditions C1 and C2 are not quite enough for the model checking analysis to account for some scenarios. If a transaction in thread t commits but never finishes, the shared variables modified by this transaction become visible to other threads. However, the analysis does not explore transitions of other threads from any state after the transaction commits. Therefore, a third condition C3 is added which states that every committed transaction must finish. In order to state this condition formally, the transition relation $\rightarrow_t$ discussed above is extended to the program store augmented with the phase variable in the natural way.

Suppose $(g,l) \in L(t), \Sigma(g, ls, ss)$ and $ls(t)=1$.  C3.

Then, there is g', ls' and ss' such that $(g', ls'(t)) \in N(t)$ and $(g, ls, ss) \rightarrow t^*(g', ls', ss')$.

The analysis is correct for any partition ($\mathcal{R}(t), \mathcal{L}(t), \mathcal{N}(t)$) of (Global×Local) satisfying conditions C1, C2, and C3. The smaller the value of $\mathcal{N}(t)$, the larger the transactions inferred by the analysis. Therefore, an implementation of the analysis should pick a value for $\mathcal{N}(t)$ that is as small as possible.

The following is a soundness theorem for the disclosed model checking analysis:

Theorem 1: Let $(g_0, ls_0, U, U^+, U^-)$ be the instrumented multithreaded program. Let $\Sigma$ be the least fixpoint of the rules in Ruleset 1. Let the conditions C1, C2, and C3 be satisfied. If $(g_0, ls_0, ss_0) \rightarrow^*(g, ls, ss)$ and $ls(t)$=wrong, then there is (g', ls', ss') and p such that $\Sigma(g', ls', ss')$ and $ls'(t) = \langle$ wrong, p $\rangle$.

Proof: Suppose $(g_0, ls_0, ss_0) \rightarrow^*(g, ls, ss)$ through some sequence of actions of various threads and $ls(t)$=wrong. First, the sequence is extended to complete all committed but unfinished transactions using condition C3. Then, one by one, each action in an uncommitted transaction is commuted to the right and dropped. Eventually, an execution sequence σ with only completed transactions and with the property that σ goes wrong if the original sequence goes wrong is obtained. Therefore, σ goes wrong as well. In σ, the transactions of a thread could have interleaved actions of another thread. The order in which transactions commit is a total order on the transactions in σ. This total order is denoted by <. σ can be transformed into an equivalent execution σ' (by appropriately right-commuting right movers and left-commuting left movers), such that σ' has the following properties: (1) for every thread t, no action of a different thread t' occurs in the middle of a transaction of thread t, (2) the transactions in σ commit in the order <. From the properties of right and left movers, it can be determined that σ' also goes wrong. Since σ' schedules each transaction to completion, the states along σ' will be explored by the rules in Ruleset 1.

TABLE 4

Ruleset 2: Level I - Reachability (INIT)

$$\overline{\Omega(g_0, ls_0, ss_0)}$$

(STEP)

$$\frac{\Omega(g, ls, ss) \forall u \neq t \cdot N(u, g, ls(u))}{\Omega(g', ls[t := l'], ss, ps[t := p'])} \text{Sum}(t, g, ls(t), g', l')$$

(PUSH)

$$\frac{\Omega(g, ls, ss) \forall u \neq t \cdot N(u, g, ls(u))}{\Omega(g', ls[t := l'], ss, [t := ss(t), f])} \text{Sum}^+(t, g, ls(t), g', l', f)$$

TABLE 4-continued

Ruleset 2: Level I - Reachability (POP)

$$\frac{\Omega(g, ls, ss) \forall u \neq t \cdot N(u, g, ls(u))}{\Omega(g', ls[t := l'], ss, [t := s])}$$

(CFL START)

$$\frac{\Omega(g, ls, ss) \forall u \neq t \cdot N(u, g, ls(u))}{P(t, g, ls(t), g, ls(t))}$$

Example 34

Model Checking with Summarization

The two-level model checking analysis is described in this section. The analysis maintains the following relations for performing summarization:

TABLE 5

Relations $P \subseteq Tid \times (Global \times Local\#) \times$
$\quad (Global \times Local\#)$
$Sum \subseteq Tid \times (Global \times Local\#) \times$
$\quad (Global \times Local\#)$
$Sum^+ \subseteq Tid \times (Global \times Local\#) \times$
$\quad (Global \times Local\#) \times Frame$
$Sum^- \subseteq Tid \times (Global \times Local\#) \times$
$\quad Frame \times (Global \times Local\#)$
$Mark \subseteq Tid \times (Global \times Local\#)$

TABLE 6

Ruleset 3: Level II - Summarization (CFL STEP)

$$\frac{P(t, g_1, l_1, g_2, l_2) \; U(t, g_2, l_2, g_3, l_3) \; \neg N(t, g_2, l_2)}{P(t, g_1, l_1, g_3, l_3)}$$

(CFL PUSH)

$$\frac{P(t, g_1, l_1, g_2, l_2) U^+(t, l_2, l_3, f) \neg N(t, g_2, l_2)}{P(t, g_2, l_3, g_2, l_3)}$$

(CFL POP)

$$\frac{P(t, g_1, l_1, g_2, l_2) U^-(t, l_2, l_3, f) \neg N(t, g_2, l_2)}{Sum^-(t, g_2, l_3, f, g_3, l_4)}$$
$$\frac{}{P(t, g_1, l_1, g_3, l_4)}$$

(CFL SUM$^-$)

$$\frac{P(t, g_1, l_1, g_2, l_2) U^-(t, l_2, f, l_3) \neg N(t, g_2, l_2)}{Sum^-(t, g_1, l_1, f, g_2, l_3)}$$

TABLE 6-continued

Ruleset 3: Level II - Summarization (CFL SUM)

$$\frac{P(t, g_1, l_1, g_2, l_2) N(t, g_2, l_2)}{Sum(t, g_1, l_1, g_2, l_2) Mark(t, g_1, l_1)}$$

(CFL SUM$^+$)

$$\frac{P(t, g_1, l_1, g_2, l_2) U^+(t, l_2, l_3, f) \neg N(t, g_2, l_2)}{Mark(t, g_2, l_3)}$$
$$\frac{}{Sum^+(t, g_1, l_1, g_2, l_3, f) Mark(t, g_1, l_1)}$$

A model checking analysis can operate in two levels. The first-level reachability analysis maintains a set of reachable states $\Omega$, but it does not use U, $U^+$, and $U^-$ directly. Instead, it calls into a second-level summarization analysis that uses U, $U^+$, and $U^-$ to compute four relations: P, Sum, $Sum^+$, and $Sum^-$. Of these four relations, the last three play roles similar to U, $U^+$, $U^-$, are used to communicate results back to the first-level analysis. Ruleset 2 gives the rules for the first-level reachability analysis and Ruleset 3 gives the rules for the second-level summarization analysis.

Referring to elements of (Global×Local$^\#$) as nodes, the relations P, Sum, $Sum^+$, and $Sum^-$ are all edges since they connect a pair of nodes. The relation Mark is a subset of nodes. The relations Sum, $Sum^+$, and $Sum^-$ are maximal edges that are computed by the summarization rules (Ruleset 3). The reachability rules and the summarization rules communicate with each other in the following way: The rule (CFL START) creates an edge in P for a thread t when every other thread is outside a transaction. Once summarization has been initiated via (CFL START) from the first level, it continues for as long as a transaction lasts, that is, until the condition N(t, $g_2$, $l_2$) becomes true of a target state ($g_2$, $l_2$). The summary edges, Sum, $Sum^+$, and $Sum^-$, generated by summarization are used by the reachability rules to do model checking, via rules STEP, PUSH, and POP in Ruleset 2. The P edges are used to initiate the computation in the summarization rules. The edges in P correspond to both "path edges" and "summary edges" in the context-free language (CFL) reachability algorithm for single-threaded programs. The rule (CFL STEP) is used to propagate path edges within a single procedure, and the rules (CFL PUSH), (CFL PROPAGATE), and (CFL POP) are used to propagate path edges across procedure boundaries. These four rules have analogs in the CFL reachability algorithm.

Figure 17:
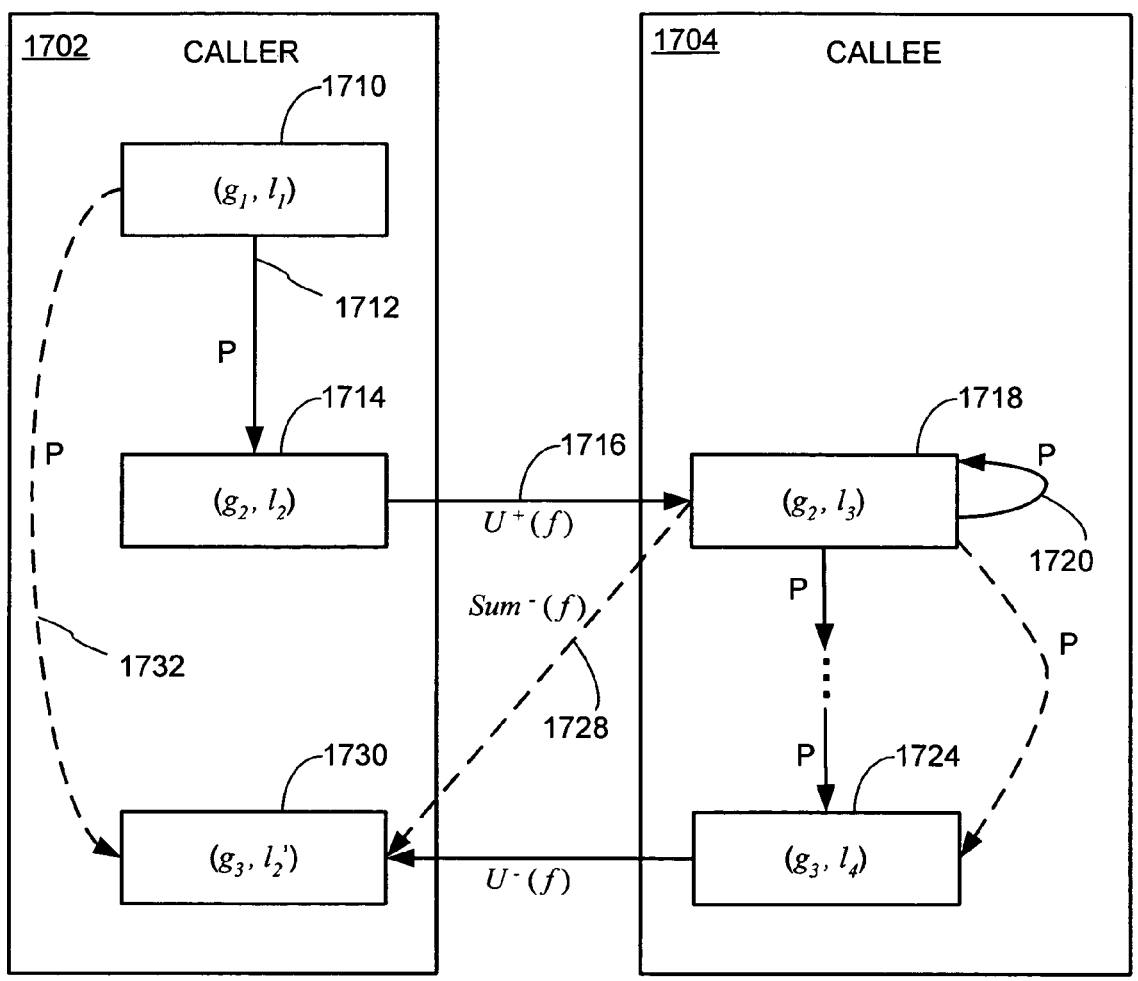
FIG. 17 is a block diagram showing an exemplary implementation of reachability and summarization rules.
Figure 18:
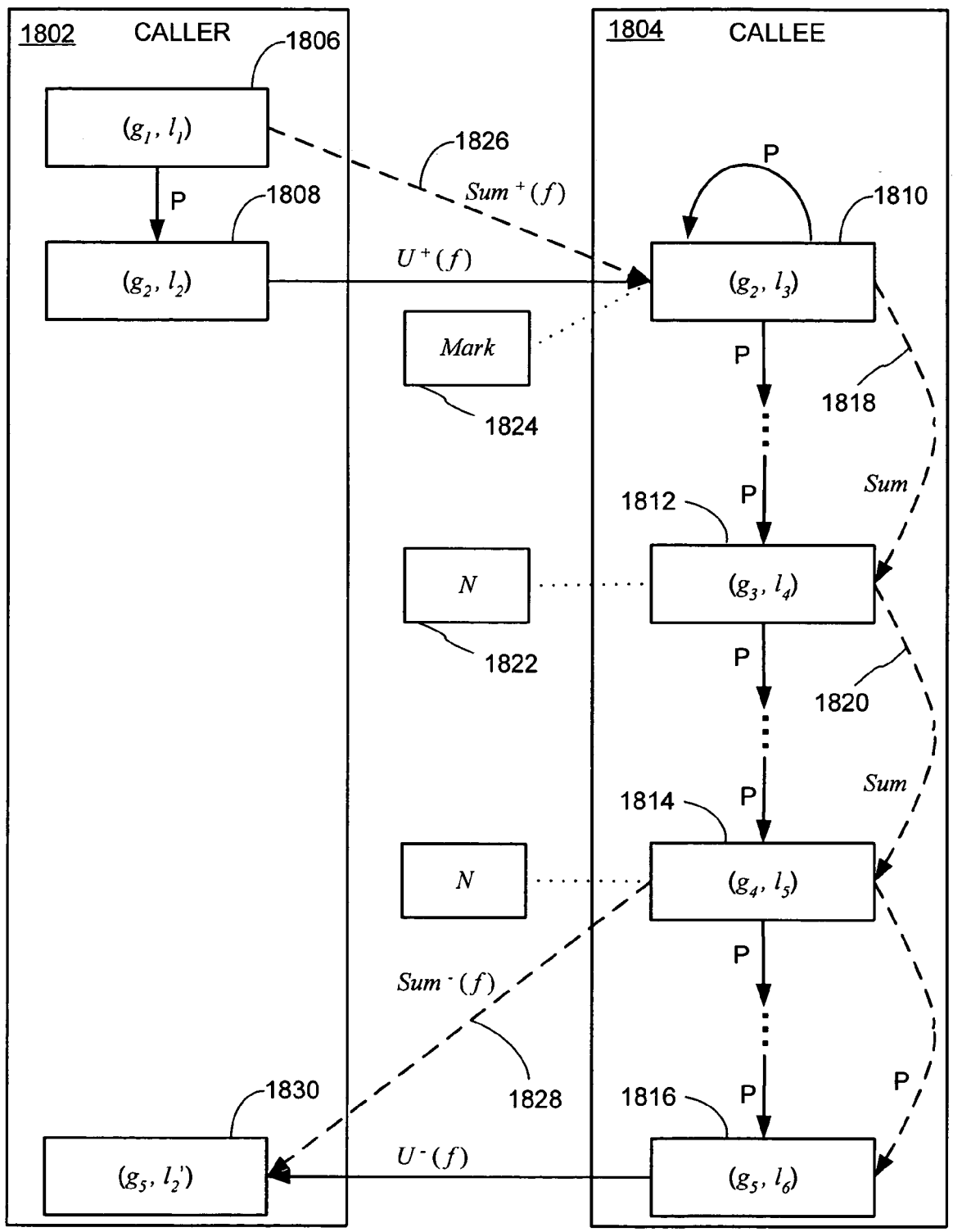
FIG. 18 is a block diagram showing another exemplary implementation of reachability and summarization rules.

FIG. 17 and FIG. 18 are block diagrams showing exemplary implementations of the reachability and summarization rules of Ruleset 2 (Level I) and Ruleset 3 (Level II), respectively. FIGS. 17 and 18 illustrate how the rules can work in two situations involving function calls. In these figures, a fixed thread identifier t is assumed, and nodes of the form (g, l) describe the global and local stores of thread t. A path edge (g,l)$\xrightarrow{P}$(g', l') indicates that P(t,g,l,g'l') is true; at a call the edge (g,l)$\xrightarrow{u+(f)}$(g', l') indicates that $U^+$(t,l,l',f) is true, and at a return the edge (g,l)$\xrightarrow{u-(f)}$(g', l') indicates that $U^-$(t,l,f,l') is true; edges labeled with Sum, $Sum^+$, and $Sum^-$ are interpreted similarly. Edges can be inferred from other edges in the figures. The inferred edges are dashed.

In FIG. 17, a caller 1702 is being summarized from a state ($g_1$, $l_1$) 1710 to the point of call at a state ($g_2$, $l_2$) 1714 by a path edge P(t, $g_1$, $l_1$, $g_2$, $l_2$) 1712. At the call, indicated by an edge $U^+$(t, $l_2$, $l_3$, f) 1716, a self loop P(t, $g_2$, $l_3$, $g_2$, $l_3$) 1720 on an entry state $(g_2, l_3)$ 1718 of a callee 1704 is inferred to start off a new procedure summary. After some computation steps in the callee 1704, a return point $(g_3, l_4)$ 1724 is reached, and a summary edge Sum$^-$(t, $g_2, l_3, g_3, l_2'$) 1728 is inferred, which connects the entry state 1718 of the callee 1704 to the state 1730 immediately following the return 1724. Finally, a path edge P(t, $g_1, l_1, g_3, l_2'$) 1732 is inferred to connect the original state $(g_1, l_1)$ 1710 to the state 1730 following the return 1724. In this exemplary implementation, P(t, $g_2, l_3, g_2, l_3$) is inferred by (CFL PUSH), P(t, $g_2, l_3, g_3, l_4$) is inferred by (CFL STEP), Sum$^-$(t, $g_2, l_3, g_3, l_2'$) is inferred by (CFL SUM$^-$), and P(t, $g_1, l_1, g_3, l_2'$) is inferred by (CFL POP).

The rules can handle the complications that arise from a transaction terminating inside a function. Due to such a transaction, a summary edge may end before the return point or begin after the entry point of a callee. The rules ensure that, if a summary for a function is only partial (e.g., it does not span across both call and return), then the reachability level will execute both the call and return actions, via the PUSH and POP rules. These situations could involve scheduling other threads before, during, or after the call, as defined by the reachability relation $\Omega$.

FIG. 18 illustrates inference of a partial summary for a function in which a transaction begins at an entry state $(g_2, l_3)$ 1810 in a callee 1804 but ends (at a state $(g_3, l_4)$ 1812) before a return point $(g_5, l_6)$ 1816. A caller 1802 has states $(g_1, l_1)$ 1806 and $(g_2, l_2)$ 1808. The end of a transaction is indicated by the fact that N(t, $g_3, l_4$) 1822 is true. A partial summary up to the transaction boundary is cached in the edge Sum(t,$g_2, l_3, g_3, l_4$) 1818 which is inferred by the rule (CFL SUM). Because this summary does not span across the entire call, the reachability algorithm must execute the call. This is ensured by the inference of Mark($g_2, l_3$) 1824 at the same time that the fact Sum(t, $g_2, l_3, g_3, l_4$) 1818 is inferred by (CFL SUM). The fact Mark($g_2, l_3$) 1824 allows the inference of Sum$^+$(t, $g_1, l_1, g_2, l_3$, f) 1826, which in turn is used by the reachability rule (PUSH) to execute the call. After executing the call, the partial summary edge Sum($g_2, l_3, g_3, l_4$) 1818 is available to the reachability level, via rule (STEP).

At state $(g_3, l_4)$ 1812 a new transaction summary begins via (CFL STEP). There is a self-loop P(t, $g_3, l_4, g_3, l_4$), not shown. The summary continues until the new transaction ends at $(g_4, l_5)$ 1814. At that point, the summary edge Sum(t, $g_3, l_4, g_4, l_5$) 1820 is inferred by rule (CFL SUM). Finally, the summary Sum$^-$(t, $g_4, l_5$, f, $g_5, l_2'$) 1828 is inferred for the transition from $(g_4, l_5)$ 1814 across the return point at $(g_5, l_6)$ 1816 to a state $(g_5, l_2')$ 1830, via rule (CFL SUM$^-$). In this exemplary implementation, P(t, $g_2, l_3, g_2, l_3$) is inferred by (CFL PUSH), Sum(t, $g_2, l_3, g_3, l_4$) is inferred by (CFL SUM), Mark(t, $g_2, l_3$) is inferred by (CFL SUM), Sum$^+$(t, $g_1, l_1, g_2, l_3$, f) is inferred by (CFL SUM$^+$), Sum(t, $g_3, l_4, g_4, l_5$) is inferred by (CFL SUM), and Sum$^-$(t, $g_4, l_5$, f, $g_5, l_2'$) is inferred by (CFL SUM$^-$).

A summary edge (either Sum, Sum$^+$, and Sum$^-$) may be computed by the summarization algorithm under any of the following three conditions:

When a transaction ends at an edge P(t, $g_1, l_1, g_2, l_2$) (indicated by N(t, $g_2, l_2$)), the rule (CFL SUM) is used to generate a Sum edge. In addition, the start-state of the call is marked using Mark(t, $g_1, l_1$).

Whenever a start state of a call is marked, the rule (CFL SUM$^+$) generates a Sum$^+$ edge at every corresponding call site, and also propagates the marking to the caller. This marking can result in additional Sum$^+$ edges being generated by iterated application of the rule (CFL SUM$^+$).

When a procedure return is encountered, a Sum$^-$ edge is generated by rule (CFL SUM$^-$).

The correctness of the analysis might depend on conditions C1 and C2 (discussed above). However, since the analysis computes the least fixpoint over a different set of equations, the condition C3 is modified to the following condition C3'. In order to state condition C3', the relation P(t, $g_1, l_1, g_2, l_2$)⊢Sum(t, $g_1, l_1, g_3, l_3$) is defined to hold if and only if there exists a proof tree using Ruleset 3 at whose root is an application of (CFL STEP) with P(t, $g_1, l_1, g_2, l_2$) among its premises and at one of whose leaves is an application of (CFL SUM) with Sum(t, $g_1, l_1, g_3, l_3$) among its conclusions. P(t, $g_1, l_1, g_2, l_2$)⊢Sum−(t, $g_1, l_1$, f, $g_3, l_3$) and P(t, $g_1, l_1, g_2, l_2$)⊢Sum+(t, $g_1, l_1, g_3, l_3$, f) are defined analogously (with applications of (CFL SUM$^-$) and (CFL SUM$^+$) at the leaves, respectively).

C3'. If P(t, $g_1, l_1, g_2, l_2$) and L(t, $g_2, l_2$), then on of the following conditions must hold:
1. P(t, $g_1, l_1, g_2, l_2$)⊢Sum(t, $g_1, l_1, g_3, l_3$) for some $g_3, l_3$.
2. P(t, $g_1, l_1, g_2, l_2$)⊢Sum−(t, $g_1, l_1$, f, $g_3, l_3$) for some $g_3, l_3$, f.
3. P(t, $g_1, l_1, g_2, l_2$)⊢Sum+(t, $g_1, l_1, l_1, g_3, l_3$, f) for Some $g_3, l_3$, f.

Theorem 2: Let $(g_0, is_0, U, U^+, U^-)$ be the instrumented multithreaded program. Let $\Omega$ be the least fixpoint of the rules in Rulesets 2 and 3. Let the conditions C1, C2, and C3' be satisfied. If $(g_0, ls_0, ss_0) \rightarrow^*(g, ls, ss)$ and ls(t)=wrong, then there is (g', ls', ss') and p such that $\Omega$(g', ls', ss') and ls'(t)=⟨wrong, p⟩.

Proof: The proof of Theorem 2 depends on the following lemmas:

Lemma 1: If $\Sigma$(g, ls, ss) and ls(t)=⟨wrong, p⟩, then there is (g', ls', ss') such that $\Sigma$(g', ls', ss'), ls'(t)=⟨wrong, p⟩, and (g', ls'(u))∈$\mathcal{N}$(u) for all u∈Tid.

Lemma 2: If $\Sigma$(g, ls, ss) and (g, ls(u))∈$\mathcal{N}$(u) for all u∈Tid, then $\Omega$(g, ls, ss).

Lemma 3: If $\Sigma$(g, ls, ss) and (g, ls(t))∉$\mathcal{N}$(t), then there are g' and l' such that P(t, g', l', g, ls(t)).

Lemma 4: The condition C3' implies the condition C3.

Lemma 3 is used to prove Lemma 4. Due to Lemma 4 and the preconditions of the theorem, the preconditions of Lemma 1 are satisfied. If $(g_0, ls_0, ss_0) \rightarrow^*(g, ls, ss)$ and ls(t)=wrong, then from Theorem 1, (g', ls', ss') and p are obtained such that $\Sigma$(g', ls', ss') and ls'(t)=⟨wrong, p=. From Lemma 1, (g'', ls'', ss'') is obtained such that $\Sigma$(g'', ls'', ss''), ls''(t)=! wrong, p=, and (g'', ls''(u))∈$\mathcal{N}$(u) for all u∈Tid. From Lemma 2, $\Omega$(g'', ls'', ss'') is obtained.

Example 35

Termination

Sufficient conditions are presented for the least fixpoint $\Omega$ of the rules in Rulesets 2 and 3 to be finite, in which case the disclosed summarization-based model checking analysis will terminate. These conditions are satisfied by a variety of realistic programs that use shared variables, synchronization, and recursion.

A frame f∈Frame corresponds to a procedure call and essentially encodes the values to which the local variables (e.g., the program counter) should be set, once the procedure call returns. Frame f is recursive if and only if there is a transition sequence $(g_0, ls_0, ss_0) \rightarrow^*(g, ls, ss)$ and a thread t such that f occurs more than once in the stack ss(t). Frame f is transactional if and only if for all transition sequences $(g_0, ls_0, ss_0) \rightarrow^* (g, ls, ss)$ and for all u∈Tid, if f occurs on the stack ss(t), then (g, ls(t))∉$\mathcal{N}$(t). If f is transactional, then in any execution, after a thread t pushes f on the stack, execution continues with all states outside $\mathcal{N}(t)$ until f is popped.

Theorem 3: Suppose the domains Tid, Global, Local, and Frame are all finite. If every recursive frame f∈Frame is transactional, then the set of reachable states Ω is finite, and the model checking analysis based on Rulesets 2 and 3 terminates.

Proof: Because the sets Global, Local, Tid, and Frame are finite, it immediately follows that the relations P, Sum, $Sum^+$, $Sum^-$ and Mark computed by the summarization rules in Ruleset 3 are finite. First, the summarization rules acting on a sequence of transitions following the push of a recursive frame f are considered. The rule (CFL SUM) cannot be applied to any premise of the form P(t, g, l, g', l'). The reason is that f is transactional, and therefore (g', l')∉$\mathcal{N}$(t). Hence, no facts of the form Mark(t, g, l) or Sum(t, g, l, g', l') can be deduced due to any pair (g', l'). Because, no such fact Mark(t, g, l) can be deduced, the rule (CFL $SUM^+$), in turn, cannot be applied to any premise of the form P(t, g, l, g', l'), and hence no fact of the form $Sum^+$(t, g, l, g', l', f) can be deduced.

The reachability rules for the set Ω acting on a sequence of states following the push of a recursive frame f are considered next. No facts of the form Sum(t, g, l, g', l') and no facts of the form $Sum^+$(t, g, l, g', l', f) can be deduced. It follows that only the reachability rules (INIT), (STEP), and (POP) can be applied. Because none of these rules push frames on the stacks, only finitely many facts of the form Ω(g, ls, ss) can be deduced from the push of a recursive frame. Since only the set Stacks can be infinite on any program, and because non-recursive frames can generate only finitely many distinct stacks, it follows that only finitely many facts Ω(g, ls, ss) can be deduced from a program all of whose recursive frames are transactional.

Example 36

Single-Threaded Programs

In a single-threaded program, the set $\mathcal{N}(1)$ can be made for the single thread to contain just the initial state of the program and the states in which the thread has gone wrong. If the program does not reach an error state, then the rule (CFL SUM) can never be applied and the summarization rules will never generate Sum or $Sum^+$ edges. Consequently, the reachability rules will never explore states in which the stack is non-empty, and the model checking analysis with summarization specializes to CFL reachability. The summary of a procedure contains only $Sum^-$ edges and is identical to the summary produced by the CFL reachability algorithm.

Example 37

Exemplary Computing Environment

Figure 19:
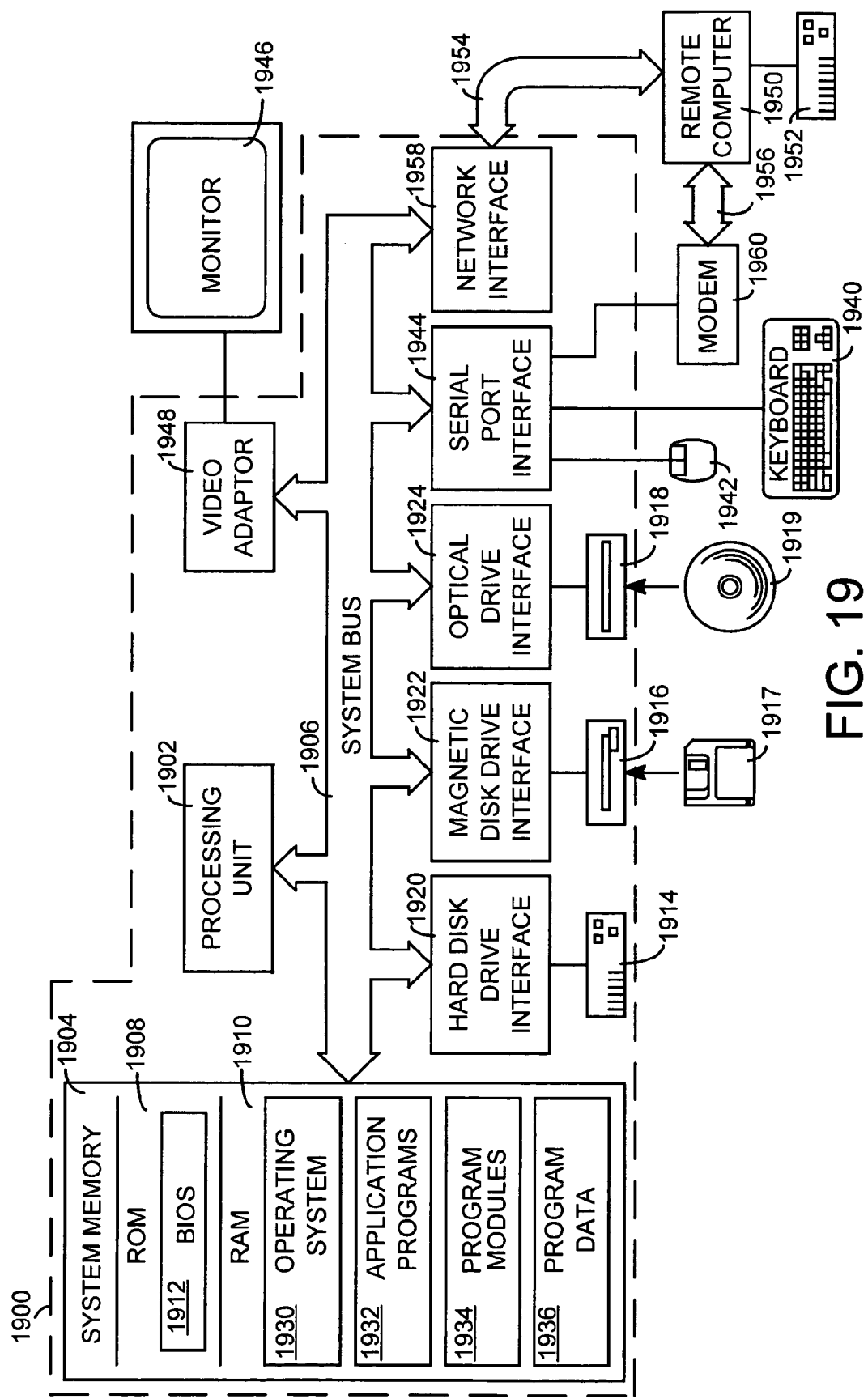
FIG. 19 is a diagram depicting a general-purpose computing device constituting an exemplary system for implementing the disclosed technology.

FIG. 19 and the following discussion are intended to provide a brief, general description of an exemplary computing environment in which the disclosed technology may be implemented. Although not required, the disclosed technology will be described in the general context of computer-executable instructions, such as program modules, being executed by a personal computer (PC). Generally, program modules include routines, programs, objects, components, data structures, etc. that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 19, an exemplary system for implementing the disclosed technology includes a general purpose computing device in the form of a conventional PC 1900, including a processing unit 1902, a system memory 1904, and a system bus 1906 that couples various system components including the system memory 1904 to the processing unit 1902. The system bus 1906 may be any of several types of bus structures including a memory bus or memory controller, a peripheral bus, and a local bus using any of a variety of bus architectures. The system memory 1904 includes read only memory (ROM) 1908 and random access memory (RAM) 1910. A basic input/output system (BIOS) 1912, containing the basic routines that help with the transfer of information between elements within the PC 1900, is stored in ROM 1908.

The PC 1900 further includes a hard disk drive 1914 for reading from and writing to a hard disk (not shown), a magnetic disk drive 1916 for reading from or writing to a removable magnetic disk 1917, and an optical disk drive 1918 for reading from or writing to a removable optical disk 1919 (such as a CD-ROM or other optical media). The hard disk drive 1914, magnetic disk drive 1916, and optical disk drive 1918 are connected to the system bus 1906 by a hard disk drive interface 1920, a magnetic disk drive interface 1922, and an optical drive interface 1924, respectively. The drives and their associated computer-readable media provide non-volatile storage of computer-readable instructions, data structures, program modules, and other data for the PC 1900. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk, magnetic disk 1917, optical disk 1919, ROM 1908, or RAM 1910, including an operating system 1930, one or more application programs 1932, other program modules 1934, and program data 1936. A user may enter commands and information into the PC 1900 through input devices such as a keyboard 1940 and pointing device 1942 (such as a mouse). Other input devices (not shown) may include a digital camera, microphone, joystick, game pad, satellite dish, scanner, or the like. These and other input devices are often connected to the processing unit 1902 through a serial port interface 1944 that is coupled to the system bus 1906, but may be connected by other interfaces such as a parallel port, game port, or universal serial bus (USB). A monitor 1946 or other type of display device is also connected to the system bus 1906 via an interface, such as a video adapter 1948. Other peripheral output devices, such as speakers and printers (not shown), may be included.

The PC 1900 may operate in a networked environment using logical connections to one or more remote computers, such as a remote computer 1950. The remote computer 1950 may be another PC, a server, a router, a network PC, or a peer device or other common network node, and typically includes many or all of the elements described above relative to the PC 1900, although only a memory storage device 1952 has been illustrated in FIG. 19. The logical connections depicted in FIG. 19 include a local area network (LAN) 1954 and a wide area network (WAN) 1956. Such networking environments are commonplace in offices, enterprise-wide computer networks, intranets, and the Internet.

When used in a LAN networking environment, the PC 1900 is connected to the LAN 1954 through a network interface 1958. When used in a WAN networking environment, the PC 1900 typically includes a modem 1960 or other means for establishing communications over the WAN 1956, such as the Internet. The modem 1960, which may be internal or external, is connected to the system bus 1906 via the serial port interface 1944. In a networked environment, program modules depicted relative to the personal computer 1900, or portions thereof, may be stored in the remote memory storage device. The network connections shown are exemplary, and other means of establishing a communications link between the computers may be used.

Alternatives

The technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. Rather, the scope of the invention includes what is covered by the following claims. We therefore claim as our invention all that comes within the scope and spirit of these claims.

We claim:

1. A computer program product embodied on a first computer-readable medium and comprising code that, when executed, causes a computer to perform a method of generating a partial procedure summary of a procedure of multithreaded software, wherein the procedure performs a plurality of actions when executed, the method comprising:

during a reachability analysis of at least a portion of the multithreaded software, reaching the procedure at a first point in the reachability analysis;

when the procedure is reached at the first point in the reachability analysis, 1) identifying at least one plurality of the actions within the procedure as atomically modelable with respect to multithreaded execution of the procedure as atomically modelable actions, wherein the atomically modelable actions are not subject to interruption by other threads, and 2) generating, by the computer, the at least one partial procedure summary of the procedure from the identified atomically modelable actions, wherein the at least one partial procedure summary comprises at least one state pair, wherein the at least one state pair models an initial state and a resulting state of the identified atomically modelable actions;

storing the at least one partial procedure summary of the procedure of multithreaded software on a second computer readable medium;

during continuation of the reachability analysis, at a second point in the reachability analysis, reaching the procedure a second time; and wherein if an initial state of the procedure reached the second time is the same as the initial state of the at least one partial procedure summary, then the resulting state of the at least one partial procedure summary is used as a state of the procedure in the reachability analysis.

2. The computer program product of claim 1, the method further comprising:

modeling execution of the software such that the state pair that comprises the partial procedure summary is executed rather than the atomically modelable actions.

3. The computer program product of claim 1, the method further comprising:

during modeling, comparing an indicated state invariant with a modeled state; and responsive to determining the modeled state fails the indicated state invariant, indicating that a programming flaw is present in the software; wherein determining the modeled state fails the indicated state invariant comprises determining that a condition is false for at least one execution path.

4. The computer program product of claim 1, wherein the resulting state comprises at least one of a plurality of possible states of the multithreaded software after execution of the modeled procedure, the method further comprising:

storing an initial program counter location within the modeled procedure for the initial state;

storing a resulting program counter location within the modeled procedure for the resulting state; and associating the initial program counter location within the modeled procedure and the resulting program counter location within the modeled procedure with the partial procedure summary.

5. The computer program product of claim 1 wherein the reachability analysis consulting the at least one partial procedure summary further comprises determining possible execution paths within the procedure and using the procedure summary to explore possible states.

6. The computer program product of claim 1 wherein the identifying comprises identifying a transaction boundary within the actions.

7. The computer program product of claim 1 wherein the identifying comprises identifying at least one of the plurality of actions as movable later in time with respect to actions executed by other threads without affecting a resulting end state.

8. The computer program product of claim 1 wherein the identifying comprises identifying a sequence of actions having zero or more right movers followed by an atomic action followed by zero or more left movers.

9. The computer program product of claim 1 wherein the plurality of actions atomically modelable with respect to multithreaded execution of the software is a subset of the plurality of actions of the procedure, the subset comprising less than all of the plurality of actions of the procedure.

10. A computer program product embodied on a first computer-readable medium and comprising code that, when executed, causes a computer to perform a method of modeling multithreaded software, the method comprising:

performing a reachability analysis of the multithreaded software;

during the reachability analysis, reaching a procedure at a first point in the reachability analysis;

analyzing actions of the multithreaded software within the procedure such that actions that can be executable atomically within the procedure are determined, wherein actions that can be executable atomically are not subject to interruption by other threads;

based on the analyzing, the computer generating a plurality of partial procedure summaries for the multithreaded software, the plurality of partial procedure summaries comprising respective start and end actions for the determined actions executable atomically; and during the reachability analysis, reaching the procedure at a second point in the reachability analysis and reusing the plurality of partial procedure summaries to determine actions executable atomically;

storing in a second computer-readable medium at least some of the plurality of generated partial procedure summaries for the multithreaded software;

wherein the partial procedure summaries comprise a plurality of modeled states of the multithreaded software for multithreaded execution of the multithreaded software.

11. The computer program product of claim 10 wherein at least one of the partial procedure summaries comprises at least two or more partial procedure summaries summarizing a procedure.

12. The computer program product of claim 10 wherein at least one of the partial procedure summaries comprises at least one partial procedure summary for a procedure, wherein the partial procedure summary summarizes less than all of the procedure.

13. The computer program product of claim 10 wherein the analyzing comprises:

identifying a series of transactions within the multithreaded software; and modeling the transactions via the partial procedure summaries.

14. A system for modeling multithreaded software, the system comprising:

a microprocessor;

a first computer-readable medium containing instructions configured to reconfigure the microprocessor to act as at least a portion of a model checker operable to analyze a model of the multithreaded software via checking the model of the multithreaded software for programming flaws, the model checker comprising:

the model of the multithreaded software, wherein the model comprises a plurality of partial procedure summaries modeling beginning states and ending states of partial summaries of procedures within the multithreaded software during multithreaded execution of the multithreaded software, the partial procedure summaries comprising the start and end states of sets of actions within the procedures, the actions atomically modelable with respect to multithreaded execution of the software in that the atomically modelable actions will all be performed within a single procedure by a same thread; and a reachability analyzer operable to employ, upon reaching the sets of actions at least a second time during a reachability analysis, one or more of the partial procedure summaries instead of the sets of actions to generate modeled states of the software; and a second computer-readable medium containing instructions configured to cause the microprocessor to store in a third computer-readable medium an indication of one or more programming flaws identified by the model checker.

15. The computer-implemented system of claim 14 wherein at least one of the partial procedure summaries comprises a partial procedure summary summarizing actions deemed to have occurred one after another without interruption by another thread.

16. The computer-implemented system of claim 15 wherein the system is operable to detect programming flaws via comparing an indicated state invariant with the modeled states.

17. The computer program product of claim 1, wherein the at least one state pair comprises an initial state of the procedure and at least one of a plurality of possible states of the multithreaded software after execution of the modeled procedure.

18. The computer program product of claim 1, wherein the resulting state is in a location in the procedure prior to the location of the initial state in the procedure.

19. A computer program product embodied on a first computer-readable medium and comprising code that, when executed, causes a computer to perform a method of generating a partial procedure summary of a procedure of multithreaded software, wherein the procedure performs a plurality of actions when executed, the method comprising:

during a reachability analysis of at least a portion of the multithreaded software, reaching the procedure at a first point in the reachability analysis;

when the procedure is reached at the first point in the reachability analysis, identifying at least one plurality of the actions within the procedure as atomically modelable with respect to multithreaded execution of the procedure as atomically modelable actions, wherein the atomically modelable actions are not subject to interruption by other threads, wherein the identifying comprises identifying a sequence of the actions within the procedure having one or more right movers followed by an atomic action followed by one or more left movers, the identifying further comprising identifying a transaction boundary within the plurality of actions using a phase variable, the phase variable indicating whether a thread is modeled as executing at least one of the one or more left movers of the identified sequence of actions or at least one of the one or more right movers of the identified sequence of actions, and generating, by the computer, the at least one partial procedure summary of the procedure from the identified atomically modelable actions, wherein the at least one partial procedure summary comprises at least one state pair and the phase variable, wherein the at least one state pair models an initial state and a resulting state of the identified atomically modelable actions;

storing the at least one partial procedure summary of the procedure of multithreaded software on a second computer readable medium;

during continuation of the reachability analysis, at a second point in the reachability analysis, reaching the procedure a second time; and wherein if an initial state of the procedure reached the second time is the same as the initial state of the at least one partial procedure summary, then the resulting state is used as a procedure state in the reachability analysis.

* * * * *